(12) United States Patent
Rajendran et al.

(10) Patent No.: US 9,513,630 B2
(45) Date of Patent: Dec. 6, 2016

(54) METHODS AND SYSTEMS FOR DATA COMMUNICATIONS

(71) Applicant: General Electric Comapny, Schenectady, NY (US)

(72) Inventors: Santhanakrishnan Rajendran, Bangalore (IN); Praful Babuji Vihol, Bangalore (IN); Dibyajyoti Pati, Bangalore (IN); Jared Klineman Cooper, Melbourne, FL (US); Robert James Foy, Melbourne, FL (US); David Michael Peltz, Melbourne, FL (US); Eugene Smith, Melbourne, FL (US); Steven Andrew Kellner, Melbourne, FL (US); Brian William Schroeck, Melbourne, FL (US); Keith Gilbertson, Grain Valley, MO (US); Joseph Forrest Noffsinger, Grain Valley, MO (US); Wolfgang Daum, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/848,746

(22) Filed: Sep. 9, 2015

(65) Prior Publication Data
US 2015/0375764 A1 Dec. 31, 2015

Related U.S. Application Data

(63) Continuation-in-part of application No. 14/193,987, filed on Feb. 28, 2014, which is a continuation-in-part
(Continued)

(51) Int. Cl.
*G06F 7/00* (2006.01)
*G06F 17/00* (2006.01)
(Continued)

(52) U.S. Cl.
CPC ......... *G05D 1/0027* (2013.01); *B61L 15/0027* (2013.01); *B61L 15/0081* (2013.01);
(Continued)

(58) Field of Classification Search
USPC .......... 701/2, 36, 1, 19; 340/425.5; 370/331, 370/425.5, 312, 432, 431; 246/7, 1
See application file for complete search history.

(56) References Cited

U.S. PATENT DOCUMENTS

| 1,517,549 A | 12/1924 | Lloyd |
| 2,635,181 A | 4/1953 | Donald |

(Continued)

FOREIGN PATENT DOCUMENTS

| CN | 1740020 A | 3/2006 |
| CN | 201044455 Y | 4/2008 |

(Continued)

OTHER PUBLICATIONS

Kirrmann, "Train Communication Network IEC 61375-4 Wire Train Bus", Ecole Polytechnique Federate de Lausanne, Jan. 20, 1999.
(Continued)

*Primary Examiner* — Ronnie Mancho
(74) *Attorney, Agent, or Firm* — John A. Kramer; Global Patent Operation

(57) ABSTRACT

A wireless communication device of a vehicle system includes one or more antennas configured to be disposed onboard a first vehicle of the vehicle system, a first modem configured to be disposed onboard the first vehicle and to communicate a first wireless signal to one or more of a second vehicle of the vehicle system or an off-board device using the one or more antennas, and a second modem configured to be disposed onboard the first vehicle and to communicate a second wireless signal to the one or more of
(Continued)

the second vehicle or the off-board device using the one or more antennas. The first modem is configured to communicate the first wireless signal via a first type of wireless communication link and the second modem is configured to communicate the second wireless signal via a different, second type of wireless communication link.

22 Claims, 10 Drawing Sheets

Related U.S. Application Data of application No. 12/948,053, filed on Nov. 17, 2010, now abandoned, and a continuation-in-part of application No. 13/729,446, filed on Dec. 28, 2012, now abandoned.

(51) Int. Cl.

| G05D 1/00 | (2006.01) |
|---|---|
| G05D 3/00 | (2006.01) |
| H04W 4/02 | (2009.01) |
| H04M 15/28 | (2006.01) |
| B61L 15/00 | (2006.01) |
| B61L 27/00 | (2006.01) |
| H04W 88/06 | (2009.01) |
| H04W 84/00 | (2009.01) |

(52) U.S. Cl.
CPC ....... *B61L 27/0005* (2013.01); *B61L 27/0088* (2013.01); *H04M 15/28* (2013.01); *H04W 4/021* (2013.01); *H04W 84/005* (2013.01); *H04W 88/06* (2013.01)

(56) References Cited

U.S. PATENT DOCUMENTS

| 2,638,536 | A | 5/1953 | Tizzard, Jr. |
|---|---|---|---|
| 3,428,868 | A | 2/1969 | Duckitt |
| 3,675,196 | A | 7/1972 | Molloy et al. |
| 3,694,751 | A | 9/1972 | Takahashi et al. |
| 3,714,419 | A | 1/1973 | Fosse et al. |
| 3,715,669 | A | 2/1973 | LaForest |
| 3,745,933 | A | 7/1973 | Eisele et al. |
| 3,750,020 | A | 7/1973 | Nagao et al. |
| 3,754,209 | A | 8/1973 | Molloy et al. |
| 3,784,813 | A | 1/1974 | Ryan |
| 3,815,085 | A | 6/1974 | Leclercq |
| 3,835,950 | A | 9/1974 | Asano et al. |
| 3,891,965 | A | 6/1975 | Schroeder |
| 3,938,129 | A | 2/1976 | Smither |
| 3,949,959 | A | 4/1976 | Rhoton |
| 4,074,879 | A | 2/1978 | Clark et al. |
| 4,081,160 | A | 3/1978 | Devy et al. |
| 4,207,569 | A | 6/1980 | Meyer |
| 4,344,364 | A | 8/1982 | Nickles et al. |
| 4,369,942 | A | 1/1983 | Wilson |
| 4,392,626 | A | 7/1983 | Pascoe |
| 4,420,133 | A | 12/1983 | Dietrich |
| 4,432,517 | A | 2/1984 | Ripamonti |
| 4,442,988 | A | 4/1984 | Laurent et al. |
| 4,491,967 | A | 1/1985 | Kobayashi et al. |
| 4,498,650 | A | 2/1985 | Smith et al. |
| 4,566,067 | A | 1/1986 | Sahasrabudhe et al. |
| 4,645,148 | A | 2/1987 | Kolkman |
| 4,655,421 | A | 4/1987 | Jaeger |
| 4,723,739 | A | 2/1988 | Franke |
| 4,735,385 | A | 4/1988 | Nickles et al. |
| 4,910,793 | A | 3/1990 | Mainardi |
| 5,019,815 | A | 5/1991 | Lemelson et al. |
| 5,056,873 | A | 10/1991 | Deno et al. |
| 5,132,682 | A | 7/1992 | Higgins et al. |
| 5,208,584 | A | 5/1993 | Kaye et al. |
| 5,219,426 | A | 6/1993 | Ehrlich |
| 5,248,967 | A | 9/1993 | Daneshfar |
| 5,289,378 | A | 2/1994 | Miller et al. |
| 5,293,632 | A | 3/1994 | Novakovich et al. |
| 5,309,155 | A | 5/1994 | Hsien et al. |
| 5,317,751 | A | 5/1994 | Novakovich et al. |
| 5,330,134 | A | 7/1994 | Ehrlich |
| 5,339,782 | A | 8/1994 | Goelzer et al. |
| 5,342,120 | A | 8/1994 | Zimmer et al. |
| 5,353,413 | A | 10/1994 | Novakovich et al. |
| 5,491,463 | A | 2/1996 | Sargeant et al. |
| 5,507,456 | A | 4/1996 | Brown et al. |
| 5,530,328 | A | 6/1996 | Fernandez et al. |
| 5,546,815 | A | 8/1996 | Wittry |
| 5,548,815 | A | 8/1996 | Takayama et al. |
| 5,581,472 | A | 12/1996 | Miller et al. |
| 5,596,569 | A | 1/1997 | Madonna et al. |
| 5,630,565 | A | 5/1997 | Lumbis |
| 5,633,629 | A | 5/1997 | Hochstein |
| 5,636,907 | A | 6/1997 | Okazaki et al. |
| 5,681,015 | A | 10/1997 | Kull |
| 5,720,455 | A | 2/1998 | Kull et al. |
| 5,738,311 | A | 4/1998 | Fernandez |
| 5,740,547 | A | 4/1998 | Kull et al. |
| 5,749,547 | A | 5/1998 | Young et al. |
| 5,785,392 | A | 7/1998 | Hart |
| 5,787,371 | A | 7/1998 | Balukin et al. |
| 5,813,635 | A | 9/1998 | Fernandez |
| 5,820,226 | A | 10/1998 | Hart |
| 5,833,325 | A | 11/1998 | Hart |
| 5,859,584 | A | 1/1999 | Counsell et al. |
| 5,867,404 | A | 2/1999 | Bryan |
| 5,870,016 | A | 2/1999 | Shrestha |
| 5,901,683 | A | 5/1999 | Patel |
| 5,928,294 | A | 7/1999 | Zelinkovsky |
| 5,934,764 | A | 8/1999 | Dimsa et al. |
| 5,950,966 | A | 9/1999 | Hungate et al. |
| 5,969,643 | A | 10/1999 | Curtis |
| 5,978,718 | A | 11/1999 | Kull |
| 5,986,577 | A | 11/1999 | Bezos |
| 5,986,579 | A | 11/1999 | Halvorson |
| 5,995,881 | A | 11/1999 | Kull |
| 6,032,905 | A | 3/2000 | Haynie |
| 6,095,618 | A | 8/2000 | Heneka et al. |
| 6,102,340 | A | 8/2000 | Peek et al. |
| 6,128,558 | A | 10/2000 | Kernwein |
| 6,163,089 | A | 12/2000 | Kull |
| 6,172,619 | B1 | 1/2001 | Lumbis et al. |
| 6,203,343 | B1 | 3/2001 | Chevassus-More et al. |
| 6,216,095 | B1 | 4/2001 | Glista |
| 6,216,985 | B1 | 4/2001 | Stephens |
| 6,217,126 | B1 | 4/2001 | Kull |
| 6,225,919 | B1 | 5/2001 | Lumbis et al. |
| 6,229,452 | B1 | 5/2001 | Kull |
| 6,275,165 | B1 | 8/2001 | Bezos |
| 6,283,765 | B1 | 9/2001 | Lumbis et al. |
| 6,313,589 | B1 | 11/2001 | Kobayashi et al. |
| 6,317,031 | B1 | 11/2001 | Rickard |
| 6,322,025 | B1 | 11/2001 | Colbert et al. |
| 6,324,659 | B1 | 11/2001 | Pierro |
| 6,330,499 | B1 | 12/2001 | Chou et al. |
| 6,360,998 | B1 | 3/2002 | Halvorson et al. |
| 6,377,215 | B1 | 4/2002 | Halvorson et al. |
| 6,384,735 | B1 | 5/2002 | Rabou et al. |
| 6,400,281 | B1 | 6/2002 | Darby, Jr. et al. |
| 6,401,015 | B1 | 6/2002 | Stewart et al. |
| 6,435,624 | B1 | 8/2002 | Kull et al. |
| 6,445,150 | B1 | 9/2002 | Tanner et al. |
| 6,452,482 | B1 | 9/2002 | Cern |
| 6,456,908 | B1 | 9/2002 | Kumar |
| 6,463,367 | B2 | 10/2002 | Neff |
| 6,487,478 | B1 | 11/2002 | Azzaro et al. |
| 6,504,485 | B2 | 1/2003 | Jinno et al. |
| 6,574,748 | B1 | 6/2003 | Andress et al. |
| 6,582,031 | B2 | 6/2003 | Newton et al. |
| 6,688,561 | B2 | 2/2004 | Mollet et al. |
| 6,759,871 | B2 | 7/2004 | Nguyen et al. |
| 6,782,044 | B1 | 8/2004 | Wright et al. |
| 6,830,224 | B2 | 12/2004 | Lewin et al. |

(56) References Cited

U.S. PATENT DOCUMENTS

| | | |
|---|---|---|
| 6,839,664 B1 | 1/2005 | Kull |
| 6,854,691 B2 | 2/2005 | Kraeling et al. |
| 6,856,865 B2 | 2/2005 | Hawthorne |
| 6,862,502 B2 | 3/2005 | Peltz et al. |
| 6,885,854 B2 | 4/2005 | Stewart |
| 6,977,578 B2 | 12/2005 | Kline |
| 6,980,127 B2 | 12/2005 | Lumbis et al. |
| 7,004,550 B2 | 2/2006 | Root et al. |
| 7,006,012 B2 | 2/2006 | Taoka et al. |
| 7,021,588 B2 | 4/2006 | Hess et al. |
| 7,038,597 B2 | 5/2006 | Smith |
| 7,042,351 B2 | 5/2006 | Kline |
| 7,062,381 B1 | 6/2006 | Rekow et al. |
| 7,069,123 B2 | 6/2006 | Lapointe |
| 7,072,408 B2 | 7/2006 | Gehlot et al. |
| 7,072,747 B2 | 7/2006 | Armbruster et al. |
| 7,075,414 B2 | 7/2006 | Giannini et al. |
| 7,076,343 B2 | 7/2006 | Kornick et al. |
| 7,079,926 B2 | 7/2006 | Kane et al. |
| 7,140,577 B2 | 11/2006 | Mollet et al. |
| 7,143,017 B2 | 11/2006 | Flynn et al. |
| 7,162,337 B2 | 1/2007 | Peltz et al. |
| 7,164,368 B1 | 1/2007 | Ireland |
| 7,222,003 B2 | 5/2007 | Stull et al. |
| 7,236,765 B2 | 6/2007 | Bonicatto et al. |
| 7,264,208 B2 | 9/2007 | Kovach et al. |
| 7,302,895 B2 | 12/2007 | Kumar et al. |
| 7,333,027 B2 | 2/2008 | Bourgault |
| 7,336,156 B2 | 2/2008 | Arita et al. |
| 7,356,389 B2 | 4/2008 | Holst et al. |
| 7,416,262 B2 | 8/2008 | Ring |
| 7,430,967 B2 | 10/2008 | Kumar |
| 7,467,032 B2 | 12/2008 | Kane et al. |
| 7,494,194 B2 | 2/2009 | Higgs et al. |
| 7,532,604 B2 | 5/2009 | Eglin |
| 7,618,011 B2 | 11/2009 | Oleski et al. |
| 7,628,458 B2 | 12/2009 | Smith et al. |
| 7,653,465 B1 | 1/2010 | Geiger et al. |
| 7,664,459 B2 | 2/2010 | Smith et al. |
| 7,667,344 B2 | 2/2010 | Zitting et al. |
| 7,673,568 B2 | 3/2010 | Marra et al. |
| 7,688,218 B2 | 3/2010 | LeFebvre et al. |
| 7,725,252 B2 | 5/2010 | Heddebaut et al. |
| 7,762,631 B2 | 7/2010 | Smith |
| 7,948,398 B2 | 5/2011 | Miller |
| 7,994,937 B2 | 8/2011 | Hsu |
| 8,157,218 B2 | 4/2012 | Riley et al. |
| 8,162,409 B2 | 4/2012 | Smith et al. |
| 8,423,208 B2 | 4/2013 | Daum et al. |
| 8,428,798 B2 | 4/2013 | Kull |
| 8,457,815 B2 | 6/2013 | Daum et al. |
| 8,504,218 B2 | 8/2013 | Mollet et al. |
| 8,532,850 B2 | 9/2013 | Cooper et al. |
| 8,589,003 B2 | 11/2013 | Brand et al. |
| 8,655,517 B2 | 2/2014 | Brand et al. |
| 8,702,043 B2 | 4/2014 | Daum et al. |
| 8,798,821 B2 | 8/2014 | Kraeling et al. |
| 8,825,239 B2 | 9/2014 | Cooper et al. |
| 8,935,022 B2 | 1/2015 | Cooper et al. |
| 2001/0044681 A1 | 11/2001 | Diana et al. |
| 2001/0044695 A1 | 11/2001 | Doner |
| 2002/0004693 A1 | 1/2002 | Collins |
| 2002/0087578 A1 | 7/2002 | Vroman |
| 2002/0186670 A1 | 12/2002 | Fuster et al. |
| 2003/0009274 A1 | 1/2003 | Peterson, Jr. et al. |
| 2003/0021441 A1 | 1/2003 | Levy et al. |
| 2003/0034423 A1 | 2/2003 | Hess, Jr. et al. |
| 2003/0087543 A1 | 5/2003 | Hess et al. |
| 2003/0137191 A1 | 7/2003 | Smith, Jr. et al. |
| 2003/0223387 A1 | 12/2003 | Davenport et al. |
| 2005/0076716 A1 | 4/2005 | Turner |
| 2005/0121971 A1 | 6/2005 | Ring |
| 2005/0125112 A1 | 6/2005 | LaDuc et al. |
| 2005/0125113 A1 | 6/2005 | Wheeler et al. |
| 2005/0143868 A1 | 6/2005 | Whelan |
| 2005/0143874 A1* | 6/2005 | Peltz ................ B61L 3/125 701/19 |
| 2005/0160169 A1 | 7/2005 | Segal et al. |
| 2005/0189815 A1 | 9/2005 | Bryant |
| 2005/0254818 A1 | 11/2005 | Zhou et al. |
| 2005/0259619 A1* | 11/2005 | Boettle ............ H04W 36/32 370/331 |
| 2006/0025903 A1 | 2/2006 | Kumar |
| 2006/0031590 A1 | 2/2006 | Monette et al. |
| 2006/0170285 A1 | 8/2006 | Morimitsu et al. |
| 2006/0180709 A1 | 8/2006 | Breton et al. |
| 2007/0061056 A1 | 3/2007 | Valsorda |
| 2007/0139168 A1* | 6/2007 | Rennie ............. G08G 1/017 340/425.5 |
| 2007/0173989 A1 | 7/2007 | Walker |
| 2007/0219681 A1 | 9/2007 | Kumar et al. |
| 2007/0229813 A1 | 10/2007 | Miyakawa et al. |
| 2007/0236079 A1 | 10/2007 | Kull |
| 2007/0241610 A1 | 10/2007 | Smith |
| 2007/0297348 A1 | 12/2007 | Trac et al. |
| 2008/0033605 A1 | 2/2008 | Daum et al. |
| 2008/0087772 A1 | 4/2008 | Smith |
| 2008/0112473 A1 | 5/2008 | Refaeli et al. |
| 2008/0128563 A1 | 6/2008 | Kumar et al. |
| 2008/0130680 A1 | 6/2008 | Choi et al. |
| 2008/0159281 A1 | 7/2008 | Jesseph |
| 2008/0173770 A1 | 7/2008 | Ruggiero et al. |
| 2008/0195265 A1 | 8/2008 | Searle et al. |
| 2009/0079560 A1 | 3/2009 | Fries et al. |
| 2009/0125170 A1 | 5/2009 | Noffsinger et al. |
| 2009/0158360 A1 | 6/2009 | Diab et al. |
| 2009/0204278 A1 | 8/2009 | Kellner et al. |
| 2009/0223760 A1 | 9/2009 | Smith |
| 2009/0234521 A1 | 9/2009 | Kumar et al. |
| 2009/0254233 A1 | 10/2009 | Noffsinger et al. |
| 2010/0034298 A1 | 2/2010 | Takahashi et al. |
| 2010/0039514 A1 | 2/2010 | Brand |
| 2010/0049384 A1 | 2/2010 | Kraeling et al. |
| 2010/0049830 A1 | 2/2010 | Chenu et al. |
| 2010/0091663 A1 | 4/2010 | Takeyama et al. |
| 2010/0118988 A1 | 5/2010 | Smith et al. |
| 2010/0130124 A1 | 5/2010 | Teeter et al. |
| 2010/0131127 A1 | 5/2010 | Desanzo |
| 2010/0171609 A1 | 7/2010 | Yeldell et al. |
| 2010/0171809 A1 | 7/2010 | Fujiyoshi |
| 2010/0174484 A1 | 7/2010 | Sivasubramaniam et al. |
| 2010/0185472 A1 | 7/2010 | Goodermuth et al. |
| 2010/0235022 A1 | 9/2010 | Siddappa et al. |
| 2010/0262321 A1 | 10/2010 | Daum et al. |
| 2010/0332058 A1 | 12/2010 | Kane et al. |
| 2011/0051663 A1 | 3/2011 | Cooper et al. |
| 2011/0093144 A1 | 4/2011 | Goodermuth et al. |
| 2011/0099413 A1 | 4/2011 | Cooper et al. |
| 2011/0279337 A1 | 11/2011 | Corwin et al. |
| 2012/0123617 A1* | 5/2012 | Noffsinger ........ B61L 15/0081 701/19 |
| 2012/0325980 A1 | 12/2012 | Noffsinger et al. |

FOREIGN PATENT DOCUMENTS

| | | |
|---|---|---|
| CN | 201146536 Y | 11/2008 |
| CN | 102104547 A | 6/2011 |
| DE | 102005057273 A1 | 5/2007 |
| EP | 0829415 A1 | 3/1998 |
| EP | 1065128 A1 | 1/2001 |
| EP | 1129919 A2 | 9/2001 |
| EP | 1693272 A1 | 8/2006 |
| EP | 1719688 A1 | 11/2006 |
| EP | 1886893 A1 | 2/2008 |
| EP | 1897781 A2 | 3/2008 |
| EP | 2487803 A1 | 8/2012 |
| KR | 20110039071 A | 4/2011 |
| RU | 2374113 C2 | 11/2009 |
| WO | 9960735 A1 | 11/1999 |
| WO | 0171942 A2 | 9/2001 |
| WO | 0222425 A1 | 3/2002 |
| WO | 2006134434 A1 | 12/2006 |
| WO | 2007060084 A1 | 5/2007 |

(56) References Cited

FOREIGN PATENT DOCUMENTS

| WO | 2007095401 A2 | 8/2007 |
| WO | 2007121043 A1 | 10/2007 |
| WO | 2010039680 A1 | 4/2010 |
| WO | 2011042943 A1 | 4/2011 |
| ZA | 200101708 A | 8/2001 |

OTHER PUBLICATIONS

Kirrmann, "Train Communication Network IEC 61375-3 Multifunction Vehicle Bus", Ecole Polytechnique Federate de Lausanne, Jan. 20, 1999.

Kirrmann et al., "The IEC/IEEE Train Communication Network", IEEE Micro, pp. 81-92, Mar.-Apr. 2001.

Horl et al., "Multiple Radio Remote Control of Locomotives in the Traction Vehicle", vol. No. 100, Issue No. 03, pp. 105-109, Mar. 1, 2002.

Kirrmann, "The IEC/IEEE/UIC Train Communication Network for time-critical and safe on-board communication", Bombardier Transportation, Jun. 10, 2002.

Babiarz et al., "Configuration Guide for DiffServ Service Classes", pp. 1-57, 2006.

Schmitz, "Information and Control Technology on Rail Vehicles", Railway Electronics, pp. 20-22, 2008.

PCT Search Report and Written Opinion issued in connection with related PCT Application No. PCT/US2010/053471 on Jan. 21, 2011.

PCT Search Report and Written Opinion issued in connection with related PCT Application No. PCT/US2011/036159 on Aug. 30, 2011.

PCT Search Report and Written Opinion issued in connection with related PCT Application No. PCT/US2011/042476 on Aug. 31, 2011.

PCT Search Report and Written Opinion issued in connection with related PCT Application No. PCT/US2011/051536 on Jan. 24, 2012.

Unofficial English Translation of Chinese Office Action issued in connection with related CN Application No. 201010157252.7 on Feb. 23, 2012.

PCT Search Report and Written Opinion issued in connection with related PCT Application No. PCT/US2011/055013 on Apr. 10, 2012.

US Non-Final Office Action issued in connection with related U.S. Appl. No. 12/891,936 on Jun. 5, 2012.

PCT Search Report and Written Opinion issued in connection with related PCT Application No. PCT/US2012/042675 on Aug. 10, 2012.

US Non-Final Office Action issued in connection with related U.S. Appl. No. 12/683,874 on Aug. 17, 2012.

US Non-Final Office Action issued in connection with related U.S. Appl. No. 12/891,925 on Oct. 15, 2012.

US Non-Final Office Action issued in connection with related U.S. Appl. No. 12/891,938 on Oct. 22, 2012.

US Final Office Action issued in connection with related U.S. Appl. No. 12/891,936 on Nov. 19, 2012.

PCT Search Report and Written Opinion issued in connection with related PCT Application No. PCT/US2012/041858 on Nov. 30, 2012.

Unofficial English Translation of Chinese Office Action issued in connection with related CN Application No. 2010101572521 on Jan. 23, 2013.

US Final Office Action issued in connection with related U.S. Appl. No. 12/980,555 on Feb. 13, 2013.

PCT Search Report and Written Opinion issued in connection with related PCT Application No. PCT/US2012/044504 on Feb. 21, 2013.

US Non-Final Office Action issued in connection with related U.S. Appl. No. 12/948,053 on Mar. 6, 2013.

US Non-Final Office Action issued in connection with related U.S. Appl. No. 12/891,936 on Mar. 7, 2013.

Non-Final Office Action issued in connection with related U.S. Appl. No. 13/523,967 on Mar. 12, 2013.

US Non-Final Office Action issued in connection with related U.S. Appl. No. 13/082,738 on Apr. 16, 2013.

US Notice of Allowance issued in connection with related U.S. Appl. No. 12/683,874 on Apr. 22, 2013.

US Non-Final Office Action issued in connection with related U.S. Appl. No. 13/082,864 on May 30, 2013.

US Non-Final Office Action issued in connection with related U.S. Appl. No. 13/186,651 on Jun. 10, 2013.

US Non-Final Office Action issued in connection with related U.S. Appl. No. 13/168,482 on Jul. 10, 2013.

US Final Office Action issued in connection with related U.S. Appl. No. 13/523,967 on Aug. 14, 2013.

US Non-Final Office Action issued in connection with related U.S. Appl. No. 12/891,936 on Aug. 16, 2013.

Final Office Action issued in connection with related U.S. Appl. No. 13/168,482 on Sep. 18, 2013.

US Non-Final Office Action issued in connection with related U.S. Appl. No. 12/948,053 on Sep. 30, 2013.

Final Office Action issued in connection with related U.S. Appl. No. 13/186,651 on Dec. 30, 2013.

US Notice of Allowance issued in connection with related U.S. Appl. No. 13/189,944 on Jan. 30, 2014.

Non-Final Office Action issued in connection with related U.S. Appl. No. 13/729,446 on Feb. 18, 2014.

Australian Office Action issued in connection with related AU Application No. 2011307497 on Apr. 8, 2014.

Non-Final Office Action issued in connection with related U.S. Appl. No. 14/154,373 on May 6, 2014.

Australian Office Action issued in connection with related AU Application No. 2011226884 on Jun. 3, 2014.

Australian Office Action issued in connection with related AU Application No. 2011302200 on Jun. 27, 2014.

Kazakhstan Office Action issued in connection with related KZ Application No. 2013/1533.1 due on Nov. 25, 2014.

Unofficial English Translation of Chinese Office Action issued in connection with related CN Application No. 201310119618.5 on Dec. 3, 2014.

US Non-Final Office Action issued in connection with related U.S. Appl. No. 14/193,987 on Mar. 3, 2015.

Non-Final Office Action issued in connection with related U.S. Appl. No. 14/566,344 on Aug. 12, 2015.

Australian Office Action issued in connection with related AU Application No. 2010200957 on Oct. 20, 2015.

Australian Office Action issued in connection with related AU Application No. 2012284493 on Dec. 1, 2015.

US Notice of Allowance issued in connection with related U.S. Appl. No. 14/566,344 on Jan. 6, 2016.

IEEE Standards Association; "Part 11: Wireless LAN Medium Access Control (MAC) and Physical Layer (PHY) Specifications"; IEEE Standard for Information technology—Telecommunications and information exchange between systems Local and metropolitan area networks—Specific requirements; IEEE computer Society; Sponsored by the LAN/MAN Standard Committee; Mar. 29, 2012; pp. 1-2793.

\* cited by examiner

METHODS AND SYSTEMS FOR DATA COMMUNICATIONS

CROSS-REFERENCE TO RELATED APPLICATIONS

This application is a continuation-in-part of U.S. patent application Ser. No. 14/193,987, which was filed on 28 Feb. 2014 (the "'987 application"). The '987 application is a continuation-in-part of U.S. patent application Ser. No. 12/948,053, which was filed on 17 Nov. 2010 (the "'053 application") and is now abandoned. The '987 Application also is a continuation-in-part of U.S. patent application Ser. No. 13/729,446, which was filed on 28 Dec. 2012 (the "'446 application") and is now abandoned. The entire disclosures of the '987 application, the '053 application, and the '446 application are incorporated by reference.

FIELD

The present disclosure is directed to methods and systems for controlling vehicle data communications.

BACKGROUND

A set of vehicles under multiple-unit (MU) control, such as a consist of rail vehicles, includes a plurality of vehicles for providing power to propel the consist that are controlled from a single location. Typically, the vehicles are spread throughout the consist to provide increased efficiency and greater operational flexibility. In one example configuration, control data generated at a lead control vehicle is sent through a dedicated, narrow-band radio link to the other, remote vehicles, to control operation of the consist from a single location.

However, under some conditions, radio transmissions between the lead vehicle and the remote vehicles are lost or degraded. For example, on some terrain, long consist configurations lose direct line-of-site between remote vehicles, and radio transmission signals do not properly reflect off of the surrounding terrain to reach the remote vehicles, resulting in a loss of data communication. Such periods of lost data communication result in reduced performance capability, increased fuel consumption, and an overall reduction in reliability of operation of the consist.

The local communications between vehicles in the vehicle consist may include various signals containing messages relating to a wide range of information, including operation, safety, status, and confirmations, among a host of others. The potentially large number of local communications transmitted between vehicles can congest the available bandwidth used to transmit the signals. Signals may get lost in the transmission, resulting in non-receipt of the contained message. Additionally, some vehicle systems may be configured upon non-receipt of certain communications to automatically shut down for safety reasons so that any potential problems with the vehicle system may be discovered. A shut-down caused by non-receipt of a local signal could result in a long delay before the vehicle system resumes its route.

BRIEF DESCRIPTION

Accordingly, to address the above issues, various embodiments of systems and methods for controlling rail vehicle data communications are described herein. For example, in one embodiment, a multiple-unit rail vehicle system comprises a first rail vehicle including a first wireless network device to detect a wireless network. The wireless network is provided by a wayside device. The rail vehicle further comprises a first communication management system to send, through the wireless network, a data communication to a second rail vehicle of the multiple-unit rail vehicle system. By relaying data communications between rail vehicles through a wireless network, the likelihood of a loss in data communication between the rail vehicles can be reduced relative to a direct radio link. For example, the wireless network provides a greater coverage range that increases the likelihood of receiving a transmitted data communication. Moreover, by employing the wireless network communication path as well as the direct radio link communication path, data communication diversity techniques can be employed to accommodate varying operating conditions. In this way, the reliability of rail vehicle data communications can be improved.

In one embodiment, a device (e.g., a wireless communication device) includes one or more antennas configured to be disposed onboard a first vehicle of a vehicle system formed from plural vehicles that include the first vehicle, a first modem configured to be disposed onboard the first vehicle and to communicate a first wireless signal to one or more of a second vehicle of the vehicles in the vehicle system or an off-board device using the one or more antennas, and a second modem configured to be disposed onboard the first vehicle and to communicate a second wireless signal to the one or more of the second vehicle or the off-board device using the one or more antennas. The first modem is configured to communicate the first wireless signal via a first type of wireless communication link and the second modem is configured to communicate the second wireless signal via a different, second type of wireless communication link.

In one embodiment a system (e.g., a communication system) includes a first wireless communication device comprising one or more first antennas, a first modem, and a second modem. The first wireless communication device is configured to be disposed onboard a first vehicle of a vehicle system formed from plural vehicles that include the first vehicle. The system also includes a second wireless communication device comprising one or more second antennas, a third modem, and a fourth modem. The second wireless communication device is configured to be disposed onboard a second vehicle of the vehicle system. The first modem and the third modem are configured to communicate a first wireless signal between the first and second vehicles via a first type of wireless communication link and the second modem and the fourth modem are configured to communicate a second wireless signal between the first and second vehicles via a different, second type of wireless communication link.

In one embodiment, a system (e.g., a communication system) includes a first wireless communication device comprising one or more first antennas, a first modem, and a second modem. The first wireless communication device is configured to be disposed onboard a first vehicle of a vehicle system formed from plural vehicles that include the first vehicle. The system also includes a second wireless communication device comprising one or more second antennas, a third modem, and a fourth modem. The second wireless communication device is configured to be disposed onboard a second vehicle of the vehicle system. The first modem and the third modem are configured to communicate a first wireless signal between the first and second vehicles via a first type of wireless communication link and the second modem and the fourth modem are configured to communicate a second wireless signal between the first and second vehicles via a different, second type of wireless communication link. The first modem and the third modem include cellular modems configured to communicate the first wireless signal as a cellular signal and the second modem and the fourth modem include non-cellular modems configured to communicate the second wireless signal as a non-cellular signal.

In one embodiment, a communication system includes a wireless communication device and a controller. The wireless communication device is configured to be disposed onboard a vehicle system having two or more propulsion-generating vehicles that are mechanically interconnected with each other in order to travel along a route together. The controller is configured to be disposed onboard the vehicle system and operatively connected with the wireless communication device in order to control operations of the wireless communication device. The controller is configured to direct the wireless communication device to switch between operating in an off-board communication mode and operating in an onboard communication mode. When the wireless communication device is operating in the off-board communication mode, the wireless communication device is configured to receive remote data signals from a location that is disposed off-board of the vehicle system. When the wireless communication device is operating in the onboard communication mode, the wireless communication device is configured to communicate local data signals between the propulsion-generating vehicles of the vehicle system.

In another embodiment, a method includes directing a wireless communication device configured to be disposed onboard a vehicle system to operate in an off-board communication mode. The vehicle system has two or more propulsion-generating vehicles that are mechanically interconnected with each other in order to travel along a route together. In the off-board communication mode, the wireless communication device is configured to receive remote data signals from a location that is disposed off-board the vehicle system. The method also includes switching the wireless communication device from operating in the off-board communication mode to operating in an onboard communication mode. In the onboard communication mode, the wireless communication device is configured to communicate local data signals between the propulsion-generating vehicles of the vehicle system. The method further includes controlling movement of the vehicle system responsive to receipt of the remote data signals and responsive to receipt of the local data signals.

In a further embodiment, a communication system includes a controller. The controller is configured to be disposed onboard a vehicle system having two or more propulsion-generating vehicles that are mechanically interconnected with each other in order to travel along a route together. The controller is configured to operatively connect with the propulsion-generating vehicles and a wireless communication device. The controller directs the wireless communication device to switch between operating in an off-board communication mode and operating in an onboard communication mode. In the off-board communication mode, the wireless communication device is configured to receive remote data signals from a location that is disposed off-board of the vehicle system. In the onboard communication mode, the wireless communication device is configured to communicate local data signals between the propulsion-generating vehicles of the vehicle system.

In another embodiment, a communication system includes a radio deployed onboard a first rail vehicle of a rail vehicle consist and operative in a first mode of operation and a second mode of operation. The radio is configured when operating in the first mode of operation to communicate at least one of voice signals or data signals between the first rail vehicle and a location off-board the rail vehicle consist using a first frequency bandwidth. The radio is configured when operating in the second mode of operating to wirelessly communicate distributed power signals from the first rail vehicle to one or more remote rail vehicles in the rail vehicle consist using a different, second frequency bandwidth, for at least one of augmenting operating of other onboard wireless devices that are configured to communicate the distributed power signals in the rail vehicle consist or for acting in place of at least one of the other onboard wireless devices.

This brief description is provided to introduce a selection of concepts in a simplified form that are further described below in the detailed description. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The inventive subject matter will be better understood from reading the following description of non-limiting embodiments, with reference to the attached drawings, wherein below.

DETAILED DESCRIPTION

The present disclosure is directed to systems and methods for data communications between remote rail vehicles of a multiple-unit rail vehicle configuration. More particularly, the present disclosure is directed to systems and methods for providing data communications through different data paths based on operating conditions. For example, in a multiple-unit rail vehicle configuration where a lead control rail vehicle remotely controls operation of the other rail vehicles, data communications are sent from the lead control rail vehicle directly to the other rail vehicles through a dedicated, narrow-band radio link, or the data communications are sent relayed through a wireless network provided by a wayside device to the remote rail vehicles based on operating conditions. In one example, data communications are relayed through the wireless network provided by the wayside device in response to not receiving a confirmation from a remote rail vehicle of receiving a data communication sent through the radio link. In another example, when the rail vehicle is in range to recognize the wireless network provided by the wayside device, data communications are relayed through the wireless network, and when the rail vehicle does not recognize the wireless network, the same data communications are sent through a different data communication path (e.g., data radio). By directing data communications through different data communication paths based on operating conditions, the same data can be sent through different communication paths and the remote rail vehicles in a multiple-unit rail vehicle configuration can remain in communication even as operating conditions vary. Accordingly, data communication between remote rail vehicles is made more reliable.

Figure 1:
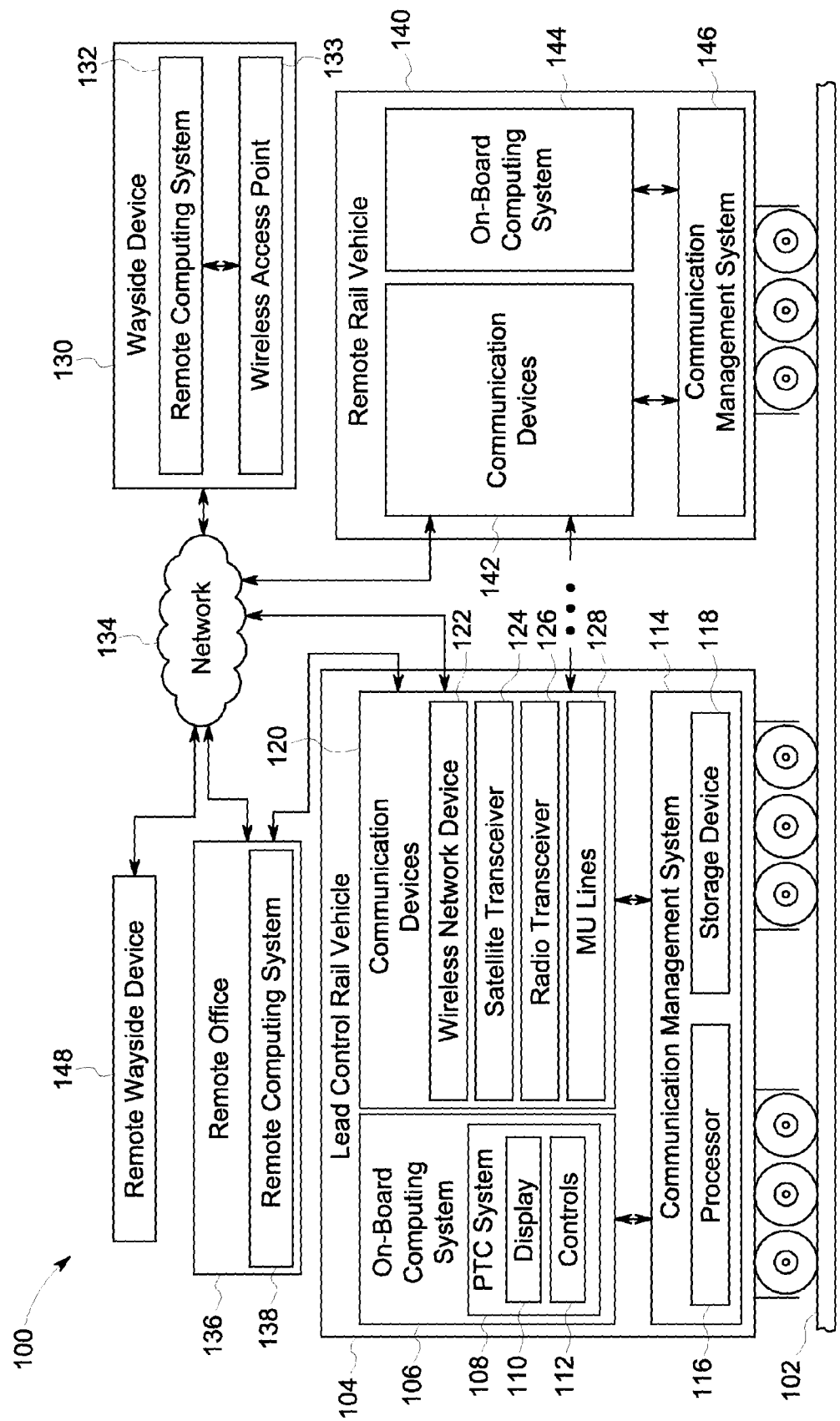
FIG. 1 is schematic diagram of an example embodiment of a rail vehicle system of the present disclosure.

FIG. 1 is a schematic diagram of an example embodiment of a vehicle system, herein depicted as a rail vehicle system 100, configured to travel on a rail 102. The rail vehicle system 100 is a multiple-unit rail vehicle system including a plurality of rail vehicles, herein depicted as a lead control rail vehicle 104 and a remote rail vehicle 140. The lead control rail vehicle 104 and the remote rail vehicle 140 represent rail vehicles that provide tractive effort to propel the rail vehicle system 100. In one example, the plurality of rail vehicles are diesel-electric vehicles that each include a diesel engine (not shown) that generates a torque output that is converted to electricity by an alternator (not shown) for subsequent propagation to a variety of downstream electrical components, such as a plurality of traction motors (not shown) to provide tractive power to propel the rail vehicle system 100.

Although only two rail vehicles are depicted, it will be appreciated that the rail vehicle system may include more than two rail vehicles. Furthermore, the rail vehicle system 100 may include rolling stock that does not provide power to propel the rail vehicle system 100. For example, the lead control rail vehicle 104 and the remote rail vehicle 140 may be separated by a plurality of units (e.g., passenger or freight cars) that do not provide propulsion. On the other hand, every unit in the multiple-unit rail vehicle system may include propulsive system components that are controllable from a single location. The rail vehicles 104, 140 are physically linked to travel together along the rail 102.

In the illustrated embodiment, the lead control rail vehicle 104 includes an on-board computing system 106 to control operation of the rail vehicle system 100. In particular, the on-board computing system 106 controls operation of a propulsion system (not shown) on-board the lead control rail vehicle 104 as well as provides control commands for other rail vehicles in the rail vehicle system, such as the remote rail vehicle 140. The on-board computing system 106 is operatively coupled with a communication management system 114 that, in turn, is operatively coupled with a plurality of communication devices 120. When the on-board computing system 106 generates data communications (e.g., control commands), the communication management system 114 determines which communication path (or device) to use for sending the data communications to the remote rail vehicle 140.

In an embodiment, the on-board computing system 106 includes a positive train control (PTC) system 108 that includes a display 110, and operational controls 112. The PTC system 108 is positioned in a cabin of the lead control rail vehicle 104 to monitor the location and movement of the rail vehicle system 100. For example, the PTC system 108 enforces travel restrictions including movement authorities that prevent unwarranted movement of the rail vehicle system 100. Based on travel information generated by the rail vehicle system 100 and/or received through the plurality of communication devices 120, the PTC system 108 determines the location of the rail vehicle system 100 and how fast it can travel based on the travel restrictions, and determines if movement enforcement is performed to adjust the speed of the rail vehicle 100. The travel information includes features of the railroad track (rail 102), such as geometry, grade, etc. Also, the travel information includes travel restriction information, such as movement authorities and speed limits, which can be travel zone or track dependent. The travel restriction information can take into account rail vehicle system state information such as length, weight, height, etc. In this way, rail vehicle collisions, over speed derailments, incursions into work zones, and/or travel through an improperly positioned switch can be reduced or prevented. As an example, the PTC system 108 provides commands to the propulsion systems of the lead control rail vehicle 104 as well as to the other rail vehicles, such as the remote rail vehicle 140, to slow or stop the rail vehicle system 100 in order to comply with a speed restriction or a movement authority.

In one example, the PTC system 108 determines location and movement authority of the rail vehicle system 100 based on travel information that is organized into a database (not shown) that is stored in a storage device of the PTC system 108. In one example, the database houses travel information that is updated by the remote office 136 and/or the wayside device 130 and is received by the communication management system 114 through one or more of the plurality of communication devices 120. In a particular example, travel information is received over a wireless network 134 provided by a wireless access point 133 of the wayside device 130 through a wireless network device 122. In one example, the rail vehicle location information is determined from GPS information received through a satellite transceiver 124. In one example, the rail vehicle location information is determined from travel information received through a radio transceiver 126. In one example, the rail vehicle location information is determined from sensors, such as beginning of rail vehicle location and end of rail vehicle location sensors that are received through the radio transceiver 126 and/or multiple-unit lines 128 from other remote rail vehicles, such as the remote rail vehicle 140 of the rail vehicle system 100.

In one embodiment, the PTC system 108 and the communication device 120 may be embodied in a PTC Ancillary Card Cage (PTC/ACC) device. This device can be used to wirelessly communicate data between two or more vehicles 104, 140 in a vehicle consist that includes the vehicles 104, 140. The PTC/ACC device can include hardware circuitry (e.g., antennas, modems, and associated transceiving circuitry) that allow the PTC/ACC device to wirelessly communicate data using radio frequency (RF) communications (e.g., Wi-Fi), cellular communications, etc. In one aspect, the PTC/ACC device can include one or more antenna and associated hardware circuitry for communicating via RF communications and one or more separate and different antenna and associated hardware circuitry for communicating via cellular communications. The PTC/ACC device can determine the location and movement authority of the rail vehicle system 100 based on travel information that is organized into a database, as described above, while also communicating with one or more other vehicles 140 in the vehicle consist that includes the vehicles 104, 140.

The display 110 presents rail vehicle state information and travel information to an operator in the cabin of the lead control rail vehicle 104. In one example, the display 110 presents a rolling map that provides an indication of the location of the rail vehicle system 100 to the operator. For example the rolling map includes a beginning of rail vehicle location, an end of rail vehicle location, rail vehicle length, rail road track zone, mile post markers, wayside device location, GPS location, etc. Furthermore, the rolling map is annotated with movement authority regulations and speed restrictions.

The operational controls 112 enable the operator to provide control commands to control operation of the rail vehicle system 100. In one example, the operational controls 112 include buttons, switches, and the like that are physically actuated to provide input. In one example, the operational controls 112 include a touch sensitive display that senses touch input by the operator. For example, the operational controls 112 include a speed control that initiates the sending of control commands to propulsion systems of the different rail vehicles of the rail vehicle system 100. In one example, the speed control includes a throttle input, a brake input, and a reverse input. In one example, the operational controls 112 include an automated control feature that automatically determines control commands based on travel information received by the PTC system 108 to automatically control operation of the rail vehicle system 100.

The communication management system 114 determines which data communication path to use for sending and receiving data communications between remote rail vehicles of the rail vehicle system 100 based on operating conditions. For example, operating conditions may include availability of a data communications path. If a plurality of data communications paths is available, operating conditions may include prioritization criteria for selecting a data communications path. Non-limiting examples of prioritization criteria include a lowest cost data communications path that is available, a highest reliability data communications path that is available, a highest bandwidth data communications path that is available, etc. The plurality of communications paths provide redundancy that enables the same data to be sent through different data paths to enable data communication between rail vehicle even as operating conditions vary.

Furthermore, the communication management system 114 manages operation of resources distributed throughout the rail vehicle system 100 and/or resources off-board the rail vehicle system 100 to meet an operational load of the rail vehicle system 100. In one example, the operational load includes processing tasks that are assigned to different computing systems of the rail vehicle system 100, the wayside device 130, and/or the remote office 136. In particular, the communication management system 114 determines which processors are available and assigns processing tasks to available processors to meet the operational load of the rail vehicle system 100. Non-limiting examples of processing tasks include determining location, determining braking distance, determining optimum speed, etc. In cases where processing tasks are performed off-board the rail vehicle system 100, such as at a remote computing system 132 of the wayside device 130, data communications are sent from the lead control rail vehicle 104 (or another rail vehicle) to the wireless network 134 through the wireless network device 122. The remote computing system 132 performs the processing task and the results are sent back to the lead control rail vehicle 104 on the wireless network 134.

In another example, operational load includes a propulsive load that is to be generated by the rail vehicle system 100 to meet a desired speed. In particular, the communication management system 114 determines the propulsive capability of available rail vehicles and relays propulsion system control commands to on-board computers on selected rail vehicles through the wireless network 134 provided by the wayside device 130 to the selected rail vehicles so as to collectively generate enough tractive power to meet the desired speed. If the speed is lower than the collective capability of the plurality of rail vehicles of the rail vehicle system 100, then control commands are relayed to some selected rail vehicle while others remain dormant. As operation load varies, the control commands can be sent to the dormant rail vehicles to provide additional capability.

Furthermore, the communication management system 114 switches operational control of the rail vehicle system 100 between on-board computers of different rail vehicles of the rail vehicle system 100 based on operating conditions. In one example, in response to degradation of the on-board computing system 106 on the lead control rail vehicle 104 (the on-board computing system 106 thereby being a degraded computing system), the communication management system 114 commands initialization of an on-board computing system on a different rail vehicle, such as remote rail vehicle 140, to take control of operation of the rail vehicle system 100

The communication management system 114 includes one or more processors 116 and a non-transitive storage device 118 that holds instructions that when executed perform operations to control the communication management system 114. For example, the storage device 118 includes instructions that when executed by processor 116 perform methods described in further detail below with reference to FIGS. 2-6.

As discussed above, the rail vehicle system 100 is equipped with a plurality of different communication devices 120 that form different data communication paths between rail vehicles of the rail vehicle system 100 as well as data communication paths off-board the rail vehicle system 100 such as with the wayside device 130 and/or the remote office 136. The communication management system 114 determines which communication device to use for data communications based on operating conditions. The plurality of communications devices 120 includes a wireless network device 122, a satellite transceiver 124, a radio transceiver 126, and multiple-unit lines 128.

The wireless network device 122 dynamically establishes a wireless communication session with a wireless network, such as the wireless network 134 provided by the wireless access point 133 of the wayside device 130, to send and receive data communications between different rail vehicles of the rail vehicle system 100. As the rail vehicle system 100 travels through different travel zones, the wireless network device 122 detects different wireless network access points provided by wayside devices or other communication devices along the railroad track (rail 102). In one example, a single wireless network covers a travel territory, and different wayside devices provide access points to the wireless network. Non-limiting examples of protocols that the wireless network device 122 follows to connect to the wireless network 134 include IEEE 802.11, Wi-Max, Wi-Fi, etc. In one example, the wireless network communications operate around the 220 MHz frequency band. The wireless network device 122 generates a unique identifier that indicates the rail vehicle system 100. The unique identifier is employed in data communication messages of rail vehicles in the rail vehicle system 100 so that wireless network devices on rail vehicles of the same rail vehicle system appropriately identify and receive message intended for them. By relaying intra-train data communications through the wireless network 134, data communication is made more reliable, especially in conditions where direct radio communication can be lost.

The satellite transceiver 124 sends and receives data communications that are relayed through a satellite. In one example, the satellite transceiver 124 communicates with the remote office 136 to send and receive data communications including travel information and the like. In one example, the satellite transceiver 124 receives rail vehicle system location information from a third-party global position system to determine the location of the rail vehicle system. In one example, the communication management system 114 assigns processing tasks to a remote computing system 138 at the remote office 136 and the data communications are sent and received through the satellite transceiver 124.

The radio transceiver 126 provides a direct radio frequency (RF) data communications link between rail vehicles of the rail vehicle system 100. For example, the radio transceiver 126 of the lead control rail vehicle 104 sends a data communication that is received by a radio transceiver on the remote rail vehicle 140. In one example, the rail vehicle system 100 may include repeaters to retransmit direct RF data communications between radio transceivers. In one example, the radio transceiver 126 includes a cellular radio transceiver to enable data communications, through a third-party, to remote sources, such as the remote office 136.

In some embodiments, the radio transceiver 126 includes a cellular radio transceiver (e.g., cellular telephone module) that enables a cellular communication path. In one example, the cellular radio transceiver communicates with cellular telephony towers located proximate to the track. For example, the cellular transceiver enables data communications between the rail vehicle system 100 and the remote office 136 through a third-party cellular provider. In one embodiment, each of two or more rail vehicles in the system (e.g., consist) has a respective cellular radio transceiver for communications with other rail vehicles in the system through the third-party cellular provider.

The multiple-unit (MU) lines 128 provide wired power connections between rail vehicles of the rail vehicle system 100. In one example, the multiple-unit lines 128 include 27 pin cables that connect between each of the rail vehicles. The multiple-unit lines 128 supply 74 Volt direct current (DC), 1 Amp power to the rail vehicles. As another example, the multiple-unit lines supply 110 Volt DC power to the rail vehicles. The power signal sent through the multiple-unit lines 128 is modulated to provide additional data communications capability. In one example, the power signal is modulated to generate a 10 M/second information pipeline. Non-limiting examples of data communications passed through the multiple-unit lines 128 includes travel information, rail vehicle state information and rail vehicle control commands, such as reverse, forward, wheel slip indication, engine run, dynamic brake control, etc.

It will be appreciated that one or more of the plurality of communication devices discussed above may be omitted from the rail vehicle system 100 without departing from the scope of the present disclosure.

The wayside device 130 may embody different devices located along a railroad track (rail 102). Non-limiting examples of wayside devices include signaling devices, switching devices, communication devices, etc. The wayside device 130 includes the remote computing system 132. In one example, the remote computing system 132 provides travel information to the rail vehicle system 100. In one example, the remote computing system 132 is assigned a processing task by the communication management system 114 in the event that available on-board processing capabilities of the rail vehicle system do not meet the operational load of the rail vehicle system 100. The wayside device 130 includes the wireless access point 133 which allows the wireless network device 122 as well as wireless network devices on other rail vehicles in range to connect to the wireless network 134. The communication management system 114 on-board rail vehicles of the rail vehicle system 100 dynamically establish network sessions with the wireless network 134 through the wireless network device 122 to relay data communication between rail vehicles of the rail vehicle system 100.

In some embodiments, under some conditions, information and/or operations are transferred between wayside devices by relaying communication over the network and through the rail vehicle system. For example, data communications are sent from the wayside device 130, through the network 134, to the wireless network device 122, and the data communications are relayed by the wireless network device 122 to a remote wayside device 148 that is in data communication range. In some cases, the rail vehicle system extends the data communication range of the wayside devices due to the length of the consist. In some cases, the wayside device 130 sends data communications through the network 134 to the remote wayside device 148 without relaying the data communications through the wireless network device 122. In one example, two wayside devices are configured to perform similar or equivalent operations, and in response to degradation of one of the wayside devices, the functionality of the degraded wayside device is transferred to the other wayside device, by sending data communications over the wireless network and relayed through the wireless network device of the rail vehicle system.

For example, two signaling light processing units are positioned within communication range of the rail vehicle system, upon degradation of one of the signaling light processing units, processing operations for the degraded signal light processing unit are transferred over the wireless network to the functioning signaling light processing unit to carry out the processing operations in order to maintain operation of the signaling light having the degraded processing unit.

Furthermore, in some cases, functionality or processing operations are transferred from a wayside device to the rail vehicle system. For example, the remote computing system 132 of the wayside device 130 is configured to calculate a braking curve for a section of track. Upon degradation of the remote computing system 132, the wayside device 130 transfers, through the wireless network 134, the brake curve calculation to the on-board computing system 106. Accordingly, the on-board computing system 106 calculates the brake curve in order to maintain functionality that would otherwise be lost due to degradation of the remote computing system 132. As another example, a switch is configured to calculate a setting or block occupancy. Upon degradation of the switch, the setting or block occupancy calculation is transferred, through the wireless network 134, to the on-board computing system 106. By relaying data communications between remote wayside devices through a rail vehicle, processing operation can be transferred between different wayside devices. Moreover, by establishing a wireless network session between a wayside device and a rail vehicle system, wayside device processing operations can be transferred from a wayside device to processing resources of a rail vehicle system. Accordingly, data communications and processing operations is made more robust since functionality is maintained even upon degradation of a rail vehicle or wayside device component.

The remote office 136 includes the remote computing system 138. In one example, the remote computing system 138 provides travel information to the rail vehicle system 100, such as a travel database that is downloaded to the on-board computing system 106. In one example, the remote office 136 communicates directly with the rail vehicle system 100 (e.g., through satellite transceiver 124). In one example, the remote office 136 relays data communications through the wireless network 134 of the wayside device 130 to the rail vehicle system 100. In one example, the remote computing system 138 is assigned a processing task by the communication management system 114 in the event that available on-board processing capabilities of the rail vehicle system do not meet the operational load of the rail vehicle system 100.

In some embodiments, the components in the lead control rail vehicle 104 are replicated in each rail vehicle in the rail vehicle system 100. For example, the remote rail vehicle 140 includes an on-board computing system 144 that is operatively coupled with a communication management system 146 that, in turn, is operatively coupled with a plurality of communication devices 142. For example, the plurality of communication devices includes a wireless network device, a satellite transceiver, a radio transceiver and multiple-unit lines. These components provide equivalent functionality and capability as the instances on the lead control rail vehicle 104. By replicating the components on each rail vehicle, each rail vehicle is capable of communicating and/or controlling the other rail vehicles in the rail vehicle system 100. Accordingly, operation of the rail vehicle system 100 is made more flexible and reliable. Note in some embodiments, one or more of the communication devices may be omitted from a rail vehicle without departing from the scope of the present disclosure.

In one aspect, the communication device 142 can represent another PTC/ACC device, as described above. The PTC/ACC devices onboard the vehicles 104, 140 can allow the vehicles 104, 140 to determine the movement and location authorities for controlling movement of the vehicles, and also can wirelessly communicate data signals between the vehicles 104, 140 for remotely controlling operations of the vehicles 104, 140. For example, the PTC/ACC device onboard the vehicle 104 can communicate signals to the PTC/ACC device onboard the vehicle 140. These signals can direct the throttle settings or positions, brake settings or positions, speeds, accelerations, etc., that the vehicle 140 is to move according to.

Figure 2:
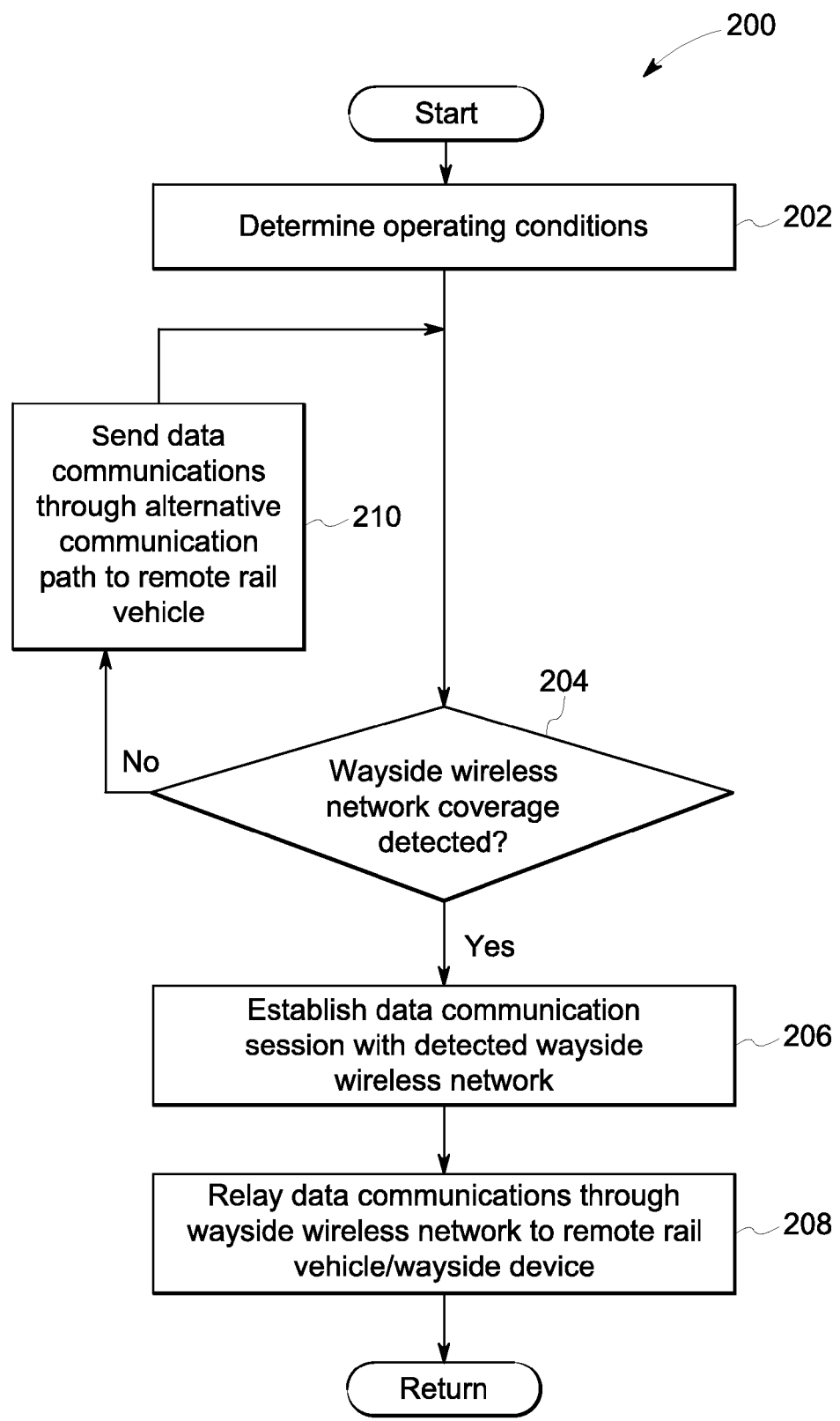
FIG. 2 is a flow diagram of an example embodiment of a method for relaying data communications through a wayside wireless network between remote rail vehicles of a multiple-unit rail vehicle system.

FIG. 2 is a flow diagram of an example embodiment of a method 200 for relaying data communications through a wayside wireless network between remote rail vehicles of a multiple-unit rail vehicle system. In one example, the method 200 is performed by the communication management system 114 of the rail vehicle system 100 depicted in FIG. 1.

At 202, the method includes determining operating conditions. Determining operating conditions includes determining whether or not an on-board computing system is functioning properly and whether or not the on-board computing system is controlling operation of remote rail vehicles of the rail vehicle system. Determining operating conditions includes determining an availability of data communication paths for the rail vehicle system. Determining operating conditions includes receiving rail vehicle state and location information.

At 204, the method includes determining if the rail vehicle system is in a coverage range of a wireless network provided by a wayside device. In one example, the wireless network device 122 detects wireless network coverage by receiving wireless network signals from a wayside device. If it is determined that wireless network coverage is detected, the method moves to 206. Otherwise, the method moves to 210.

At 206, the method includes dynamically establishing a data communication session with the detected wayside wireless network. In one example, establishing the data communication session includes assigning a unique address to the rail vehicle system, so that rail vehicles in the rail vehicle system can identify messages intended for the rail vehicles as opposed to message intended for another rail vehicle system. The unique address may include a symbol for the rail vehicle system or unique attribute of rail vehicle system.

At 208, the method includes relaying data communications through the wayside wireless network to a remote rail vehicle of the rail vehicle system and/or a remote wayside device. In one example, the communication management system 114 sends data communications through the wireless network device 122 to the wireless access point 133. Subsequently, the data communications are relayed over the wireless network 134 to a wireless network device of a remote rail vehicle. For example, the wireless access point 133 sends the data communications to the wireless network device of the remote rail vehicle. In one example, the data communications include control commands to remotely control operation of the remote rail vehicle. In one example, data communications are sent from the wayside device 130, over the wireless network 134 and relayed through the wireless network device 122, to the remote wayside device 148.

At 210, the method includes sending data communication through an alternative communication path to the remote rail vehicle. Since there is insufficient wireless network coverage, the communication management system 114 selects a different communication device to send the data communications to the remote rail vehicle. Insufficient network coverage includes little or no network coverage that would make data communication through the wireless network less reliable. In one example, the communication management system 114 sends data communication through the radio transceiver 126 to the remote rail vehicle. In one example, the communication management system 114 sends data communications through the multiple-unit lines 128 to the remote rail vehicle. Note the same data is sent through the different communication paths to enable data communication between rail vehicles of the rail vehicle system 100.

The above described method enables intra-train data communications to be sent from one rail vehicle in a multiple-unit rail vehicle system (e.g., consist), relayed through a wayside wireless network, and received by a remote rail vehicle of the multiple-unit rail vehicle system. By relaying intra-train data communications through the wayside wireless network when network coverage is available, the reliability of data communications can be improved by the established data communications session. Moreover, the above-described method enables flexible operation by sending data communications through another communication path when wireless network coverage is not available.

Figure 3:
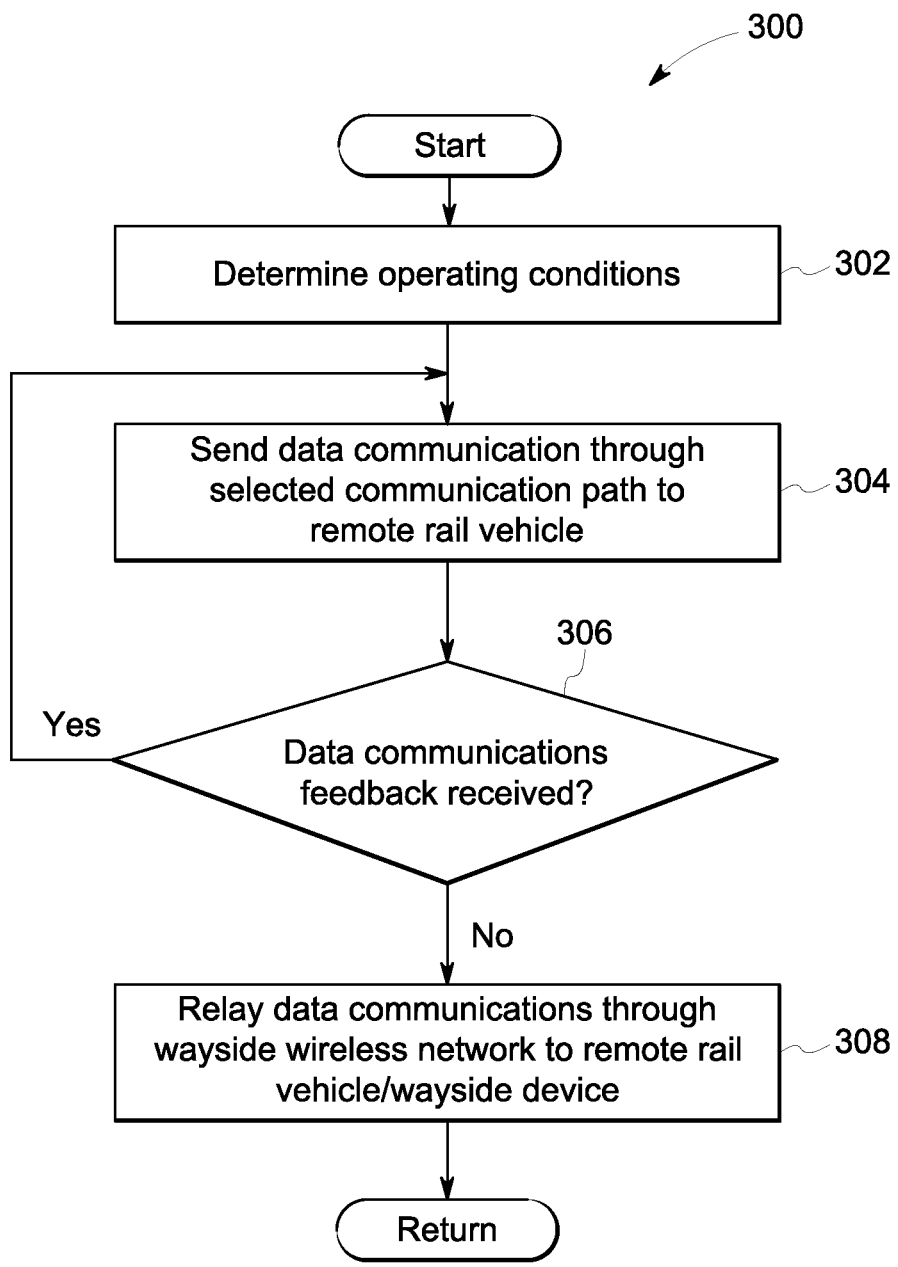
FIG. 3 is a flow diagram of an example embodiment of a method for relaying data communications through a wayside wireless network between remote rail vehicles of a multiple-unit rail vehicle system in response to a loss of data communications.

FIG. 3 is a flow diagram of an example embodiment of a method 300 for relaying data communications through a wayside wireless network between remote rail vehicles of a multiple-unit rail vehicle system in response to a loss in data communications through an alternative data path. In one example, the method 300 is performed by the communication management system 114 of the rail vehicle system 100 depicted in FIG. 1.

At 302, the method includes determining operating conditions. Determining operating conditions includes determining whether or not an on-board computing system is functioning properly and whether or not the on-board computing system is controlling operation of remote rail vehicles of the rail vehicle system. Determining operating conditions includes determining an availability of data communication paths for the rail vehicle system. Determining operating conditions includes receiving rail vehicle state and location information.

At 304, the method includes sending data communications through a selected communication path to a remote rail vehicle in the multiple-unit rail vehicle system. In one example, the selected data communication path includes a direct RF link to the remote rail vehicle, where data communications are sent through the radio transceiver 126.

At 306, the method includes determining if data communications feedback is received. In one example, data communications feedback includes a confirmation received from the remote rail vehicle indicating that the remote rail vehicle received the data communications. In one example, where the data communications include control commands, the data communications feedback includes an adjustment in operation of the remote rail vehicle. If it is determined that data communication feedback is received, the method moves returns to 304. Otherwise, the method moves to 308.

In one example, data communications are sent through a direct RF link between remote rail vehicles. However, various conditions may cause a loss of data communications. For example, a rail vehicle system configuration, such as a very long consist where there is a large distance between rail vehicles, may cause a loss of data communications through the direct RF link. As another example, geography, such as terrain that does not reflect a radio signal to a remote vehicle, may cause a loss of data communications through the direct RF link.

At 308, the method includes relaying data communications through the wayside wireless network to a remote rail vehicle of the rail vehicle system and/or a remote wayside device. The same data is relayed through the wayside wireless network in response to a loss of data communications by an alternative data communications path. In one example, the communication management system 114 sends data communications to the wireless network 134 through the wireless network device 122. Subsequently, the wireless network 134 relays the data communications to a wireless network device of a remote rail vehicle. In one example, the data communications include control commands to remotely control operation of the remote rail vehicle. In one example, data communications are sent from the wayside device 130, over the wireless network 134 and relayed through the wireless network device 122, to the remote wayside device 148.

By relaying data communications through a wayside wireless network in response to a loss of data communications by an alternative data communications path (e.g., a direct RF link), intra-train data communication can be achieved between remote rail vehicles even when operating conditions prevent communication by the alternate communications path. Accordingly, intra-train data communications and remote control of rail vehicles in a multi-unit rail vehicle system is made more robust and reliable as operating conditions vary.

Figure 4:
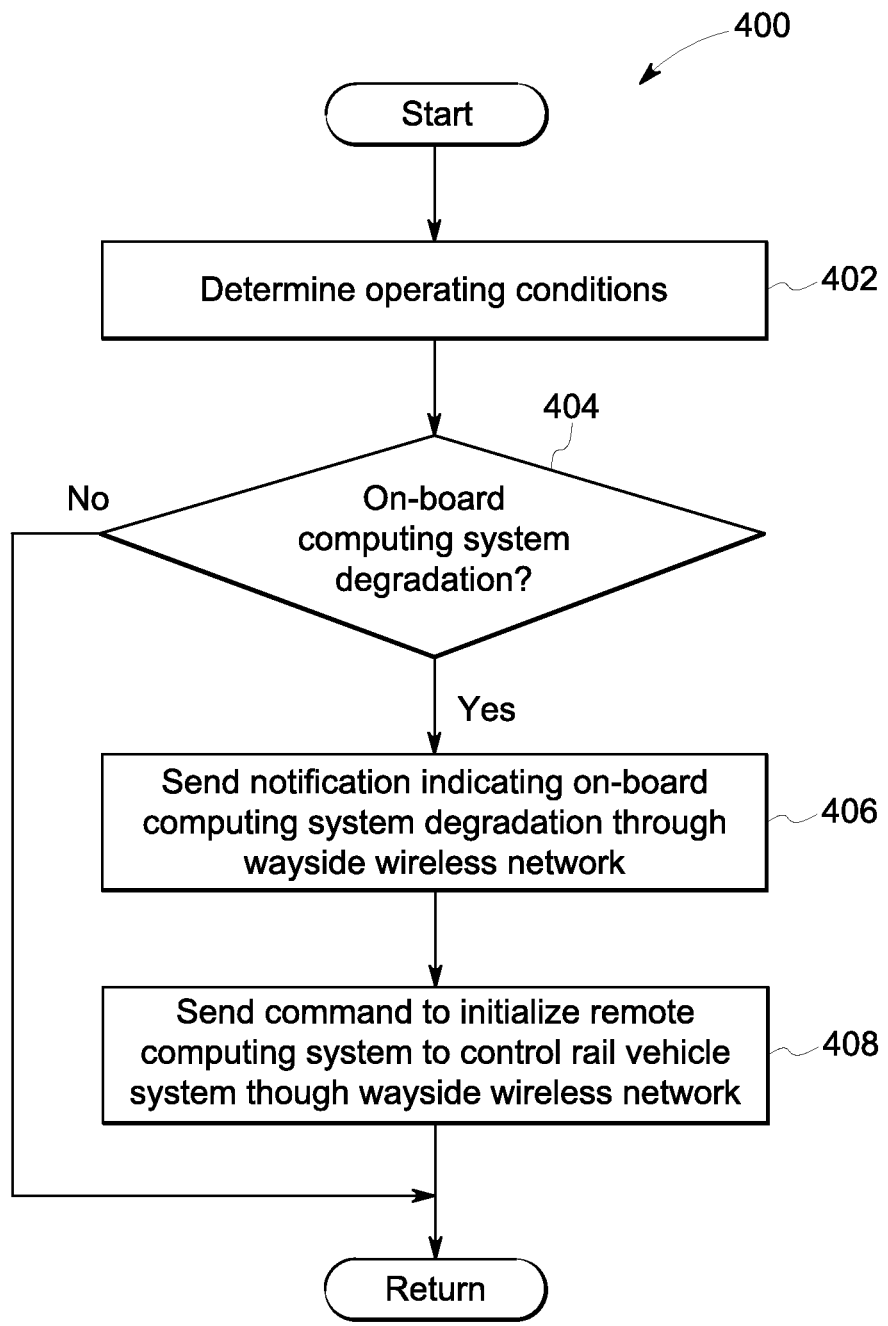
FIG. 4 is a flow diagram of an example embodiment of a method for transferring control to a rail vehicle of a multiple-unit rail vehicle system through a wayside wireless network.

FIG. 4 is a flow diagram of an example embodiment of a method 400 for transferring control to a rail vehicle of a multiple-unit rail vehicle system through a wayside wireless network. In one example, the method 400 is performed by the communication management system 114 of the rail vehicle system 100 depicted in FIG. 1.

At 402, the method includes determining operating conditions. Determining operating conditions includes determining whether or not an on-board computing system is functioning properly and whether or not the on-board computing system is controlling operation of remote rail vehicles of the rail vehicle system. Determining operating conditions includes determining an availability of data communication paths for the rail vehicle system. Determining operating conditions includes receiving rail vehicle state and location information.

At 404, the method includes determining if the on-board computing system is degraded. In one example, the degradation determination is made responsive to setting of a localized flag indicating a component of the on-board computing system is not functioning properly. In one example, the degradation determination is made based on unresponsiveness to control adjustment made manually or automatically. If it is determined that the on-board computing system is degraded, the method moves to 406. Otherwise, the method returns to other operations.

At 406, the method includes sending a notification, through the wayside wireless network, indicating degradation of the on-board computing system. In some cases, the notification is relayed to other remote rail vehicles of the rail vehicle system. In some cases, the notification is relayed to a remote office. In one example, the notification includes a signal commanding an alarm to sound to notify an operator locally or remotely.

At 408, the method includes sending a command, through the wayside wireless network, to initialize a remote computing system to control the rail vehicle system. In one example, the initialization command is sent to a remote computing system located off-board the rail vehicle system, such as at a remote office to control the rail vehicle system remotely. In one example, the initialization command is sent to another on-board computing device located in a different rail vehicle of the rail vehicle system. Since each rail vehicle is equipped with the same or a similar set of components, control of the rail vehicle system can be transferred from an on-board computing system on one rail vehicle to an on-board computing system on another rail vehicle.

By transferring operational control from an on-board computing system to a remote computing system through the wayside wireless network based on degradation of the on-board computing system, operation control of the rail vehicle system can be maintained even when a controlling on-board computing system becomes degraded. In this way, the rail vehicle is made more robust.

Figure 5:
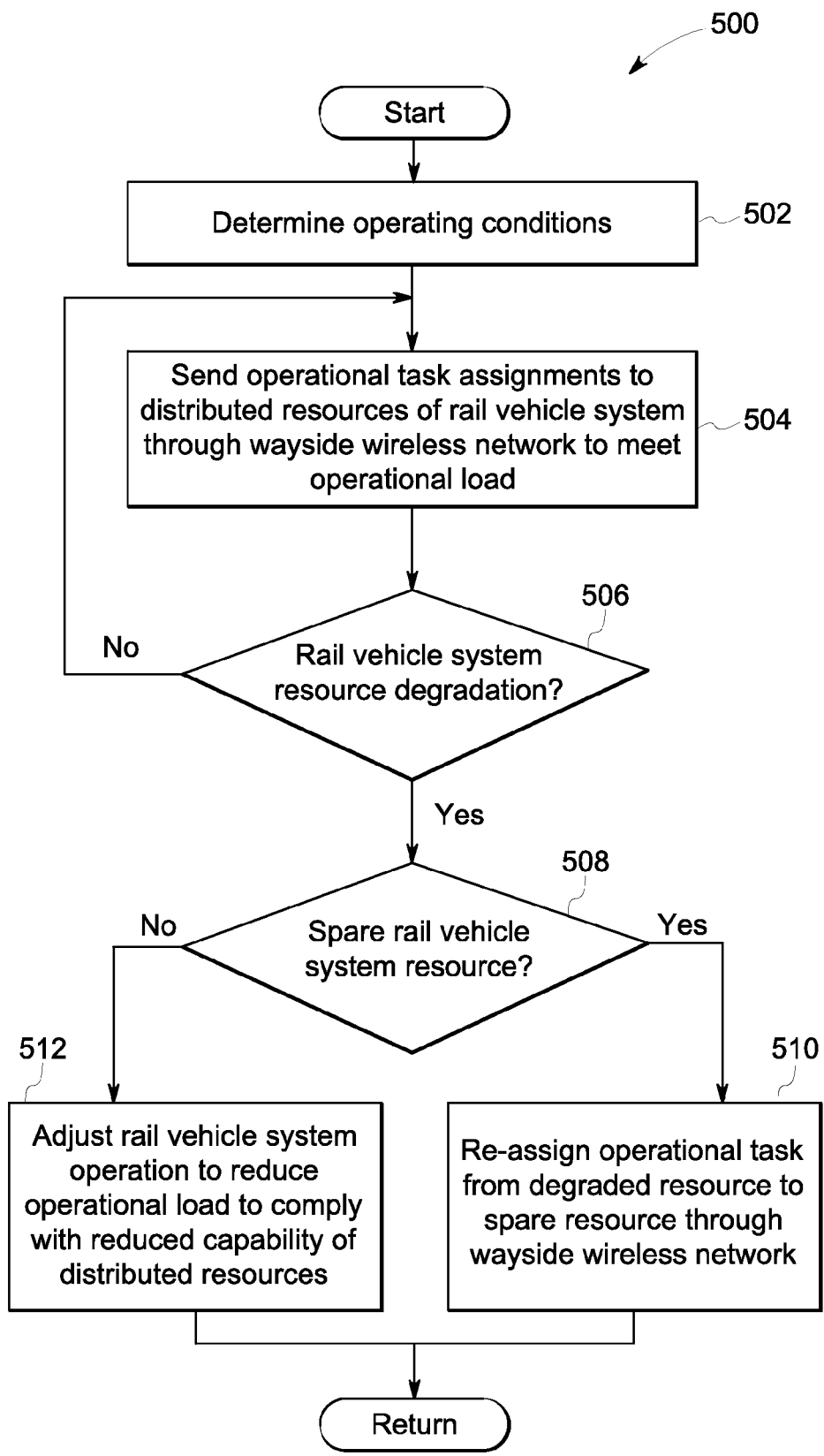
FIG. 5 is a flow diagram of an example embodiment of a method for distributing operating tasks to different remote resources of a multiple-unit rail vehicle system through a wayside wireless network responsive to resource degradation.

FIG. 5 is a flow diagram of an example embodiment of a method 500 for distributing operational tasks to different resources of a multiple-unit rail vehicle system through a wayside wireless network responsive to resource degradation. In one example, the method 500 is performed by the communication management system 114 of the rail vehicle system 100 depicted in FIG. 1. In another example, the method 400 is performed by the remote computing system 132 of the wayside device 130 depicted in FIG. 1.

At 502, the method includes determining operating conditions. Determining operating conditions includes determining whether or not an on-board computing system or a remote computing system of the rail vehicle system is functioning properly. Determining operating conditions includes determining an availability of data communication paths for the rail vehicle system. Determining operating conditions includes receiving rail vehicle state and location information. Determining operating conditions includes determining the collective capabilities of resources of the rail vehicle system. In one example, the collective capabilities include processing capabilities of available computing systems on-board or off-board the rail vehicle system. In one example, the collective capabilities include available propulsive/braking capabilities of the rail vehicles in the rail vehicle system. For example, the propulsive capabilities include the torque output capability of each traction motor of the rail vehicle system based on operating conditions.

At 504, the method includes sending, through the wayside wireless network, operational task assignments to distributed resources of the rail vehicle system to meet an operational load. In cases where the operational load is a processing load, processing tasks are assigned to available processing resources of different remote computing systems. In some cases, the remote computing systems are on-board computing system located on remote rail vehicles of the rail vehicle system. In some cases, the remote computing systems are off-board computing systems located at the remote office or in the wayside device. In cases where the operational load is a propulsive/braking load, such as a torque output or brake demand to meet a desired travel speed, the operational tasks include a desired propulsive/brake output to be produced by each remote rail vehicle in order for the rail vehicle system to meet the desired travel speed.

At 506, the method includes determining if a rail vehicle system or wayside device resource is degraded. In one example, the rail vehicle or wayside device resource includes a processing resource of a computing system the can become degraded or unavailable. In one example, the rail vehicle resource includes a propulsive/brake resource, such as a traction motor or an air brake. If it is determined that the rail vehicle system resource is degraded, the method moves to 508. Otherwise, the method returns to 504.

At 508, the method includes determining if a spare rail vehicle system resource is available. Under some conditions, the entirety of the capabilities of the rail vehicle system resources are not used to meet the operational load, thus additional resources are available for use. If it is determined that a spare rail vehicle system resource is available for use, the method moves to 510. Otherwise, the method moves to 512.

At 510, the method includes re-assigning, through the wayside wireless network, the operational task from the degraded rail vehicle system resource to the spare rail vehicle system resource. In one example where the operational task is a processing task, re-assigning includes sending a command for a remote computing system on-board or off-board of the rail vehicle system to perform the processing task. In one example where the operational task is a propulsive/braking output, re-assigning includes sending a command for a spare propulsive/braking resource to adjust operation to meet the propulsive/braking output.

At 512, the method includes adjusting rail vehicle system operation to reduce the operational load to comply with the reduced capability of the distributed rail vehicle system resources. In one example where the operational load is a processing load, adjusting rail vehicle operation includes cancelling a processing task or delaying a processing task from being carried out until a processing resource becomes available. In one example where the operational load is a propulsive/brake load, adjusting rail vehicle operation includes reducing travel speed or operating a different brake component. Furthermore, in cases where the operational load is less than the collective capability of the remaining distributed resources, the operational task can be re-assigned to a remaining available resource.

By re-assigning operational tasks to distributed resources of the rail vehicle system and/or a wayside device in response to resource degradation or unavailability, the operational load is still met by the remaining resources. In this way, the rail vehicle system is made more robust since operation is maintained even when a rail vehicle system resource degrades. Moreover, by sending data communications through the wayside wireless network, which has a high data rate transport capability, the data communication path has the capacity to handle the intra-train data communications.

Figure 6:
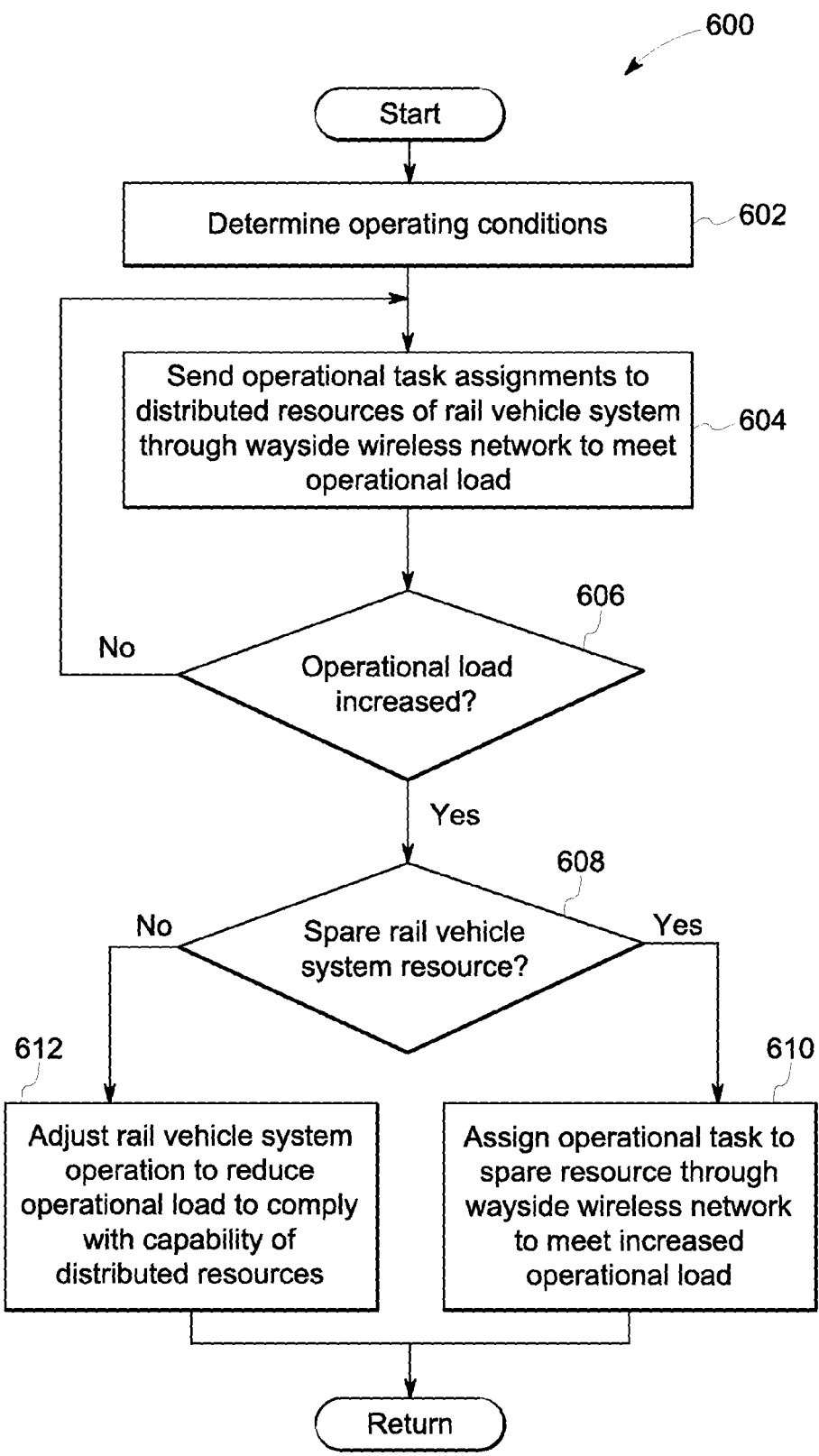
FIG. 6 is a flow diagram of an example embodiment of a method for distributing operating tasks to different remote resources of a multiple-unit rail vehicle system through a wayside wireless network responsive to a change in operating load.

FIG. 6 is a flow diagram of an example embodiment of a method for distributing operational tasks to different remote resources of a multiple-unit rail vehicle configuration through a wayside wireless network responsive to a change in operational load. In one example, the method 500 is performed by the communication management system 114 of the rail vehicle system 100 depicted in FIG. 1.

At 602, the method includes determining operating conditions. Determining operating conditions includes determining whether or not an on-board computing system or a remote computing system of the rail vehicle system is functioning properly. Determining operating conditions includes determining an availability of data communication paths for the rail vehicle system. Determining operating conditions includes receiving rail vehicle state and location information. Determining operating conditions includes determining the collective capabilities of resources of the rail vehicle system. In one example, the collective capabilities include processing capabilities of available computing systems on-board or off-board the rail vehicle system. In one example, the collective capabilities include available propulsive/braking capabilities of the rail vehicles in the rail vehicle system. For example, the propulsive capabilities include the torque output capability of each traction motor of the rail vehicle system based on operating conditions.

At 604, the method includes sending, through the wayside wireless network, operational task assignments to distributed resources of the rail vehicle system to meet an operational load. In cases where the operational load is a processing load, processing tasks are assigned to available processing resources of different remote computing systems.

In some cases, the remote computing systems are on-board computing system located on remote rail vehicles of the rail vehicle system. In some cases, the remote computing systems are off-board computing systems located at the remote office or in the wayside device. In cases where the operational load is a propulsive/braking load, such as a torque output or brake demand to meet a desired travel speed, the operational tasks include a desired propulsive/brake output to be produced by each remote rail vehicle in order for the rail vehicle system to meet the desired travel speed.

At 606, the method includes determining if the operational load is increased. In cases where the operational load is a processing load, the operational load is increased when another processing task is generated and needs to be carried out. Non-limiting examples of processing tasks include, calculating brake distance, determining location, determining railroad track state, calculating speed for optimum fuel efficiency, etc. In cases where the operational load a propulsive load, the operational load is increased when the output (e.g., torque, speed) demand is increased. If it is determined that the operational load is increased, the method moves to 608. Otherwise, the method returns to 604.

At 608, the method includes determining if a spare rail vehicle system resource is available. Under some conditions, the entirety of the capabilities of the rail vehicle system resources are not used to meet the operational load, thus additional resources are available for use. If it is determined that a spare rail vehicle system resource is available for use, the method moves to 610. Otherwise, the method moves to 612.

At 610, the method includes assigning, through the wayside wireless network, the operational task associated with the increase in operational load to the spare rail vehicle system resource. In one example where the operational task is a processing task, assigning includes sending a command for a remote computing system on-board or off-board of the rail vehicle system to perform the processing task. In one example where the operational task is a propulsive/braking output, assigning includes sending a command for a spare propulsive/braking resource to adjust operation to meet the propulsive/braking output. In some cases, a plurality of resources is commanded to adjust operation to collectively meet the increase in operational load.

At 612, the method includes adjusting rail vehicle system operation to reduce the operational load to comply with the capability of the distributed rail vehicle system resources. In one example where the operational load is a processing load, adjusting rail vehicle operation includes cancelling a processing task or delaying a processing task from being carried out until a processing resource becomes available. In one example where the operational load is a propulsive/brake load, adjusting rail vehicle operation includes reducing output (e.g., torque demand, speed demand) or operating a different brake component. Furthermore, in cases where the operational load is less than the collective capability of the remaining distributed resources, the operational task can be assigned to a remaining available resource.

By assigning new operational tasks to distributed resources of the rail vehicle system in response to an increase in operational load, the operational load is met even as operating conditions vary. In this way, the rail vehicle system is made more robust. Moreover, by sending data communications through the wayside wireless network, which has a high data rate transport capability, the data communication path has the capacity to handle the intra-train data communications, as opposed to other data communication paths that have less bandwidth and do not have the capacity to handle some levels of data communications.

Another embodiment relates to a method for controlling data communication for a rail vehicle. The method comprises establishing (at the rail vehicle) a data communication session with a wireless network provided by a wayside device. The method further includes sending a data communication from the rail vehicle to a remote rail vehicle through the wireless network. (The rail vehicle and remote rail vehicle are in a train or other rail vehicle consist.)

In an embodiment, the wireless network provided by a wayside device is a general purpose, non-rail wireless network, meaning a wireless network set up for general communications by multiple parties (e.g., the public) and not specifically for purposes of rail vehicle communications. Examples include cellular networks and Wi-Fi "hotspots" at public commercial establishments.

In an embodiment, a wireless network is a telecommunications/computer network whose interconnections between nodes are implemented using RF signals, for purposes of data communications (e.g., transmission of addressed data packets) between nodes.

One or more embodiments disclosed herein describe a communication system and method used in conjunction with a vehicle system having plural propulsion-generating vehicles. Two or more of the propulsion-generating vehicles include wireless communication devices onboard the propulsion-generating vehicles. A first wireless communication device communicates remote data signals with a location disposed off-board the vehicle system. The remote data signals may be warning signals, such as signals communicated in a positive train control (PTC) system. As such, the first wireless communication device also is referred to as a remote wireless communication device. A second wireless communication device disposed onboard the propulsion-generating vehicles may be configured to communicate local data signals between the propulsion-generating vehicles, and is also referred to as a local wireless communication device. The local data signals may be signals used to control tractive efforts or braking efforts of the propulsion-generating vehicles, such as distributed power (DP) signals.

During operation of the vehicle system, the local wireless communication device communicates local messages between the propulsion-generating vehicles in the vehicle system to coordinate operations of the propulsion-generating vehicles. The remote wireless communication device "listens" for remote data signals sent from off-board locations, such as a dispatch or another vehicle system. The remote wireless communication device can be controlled to switch from an off-board communication mode, where the remote wireless communication device communicates remote data signals, to an onboard communication mode, where the remote wireless communication device communicates local data signals.

In one example, when the remote wireless communication device is not receiving remote data signals, the remote wireless communication device is configured to switch automatically from the off-board communication mode to the onboard communication mode. In the onboard mode, the remote wireless communication device may supplement the local wireless communication device by augmenting the bandwidth provided by the local wireless communication device to communicate local data signals between the propulsion-generating vehicles. The remote wireless communication device can augment the available bandwidth by providing a separate communication data path. However, in an embodiment, even while operating in the onboard communication mode, the remote wireless communication device can "listen" for remote data signals communicated from an off-board source, and may be configured to autonomously revert back to the off-board communication mode upon receiving a remote data signal.

A more particular description of the inventive subject matter briefly described above will be rendered by reference to specific embodiments thereof that are illustrated in the appended drawings. The inventive subject matter will be described and explained with the understanding that these drawings depict only typical embodiments of the inventive subject matter and are not therefore to be considered to be limiting of its scope. Throughout the description of the embodiments, the terms "radio link," "RF (radio frequency) link," and "RF communications" and similar terms describe a method of communicating between two nodes in a network, such as a lead and a remote locomotive of a distributed power train. It should be understood that the communications between nodes in the system is not limited to radio or RF systems or the like and is meant to cover all techniques by which messages may be delivered from one node to another or to plural others, including without limitation, magnetic systems, acoustic systems, and optical systems. Likewise, the inventive subject matter is not limited to a described embodiment in which RF links are used between nodes and the various components are compatible with such links.

Figure 7:
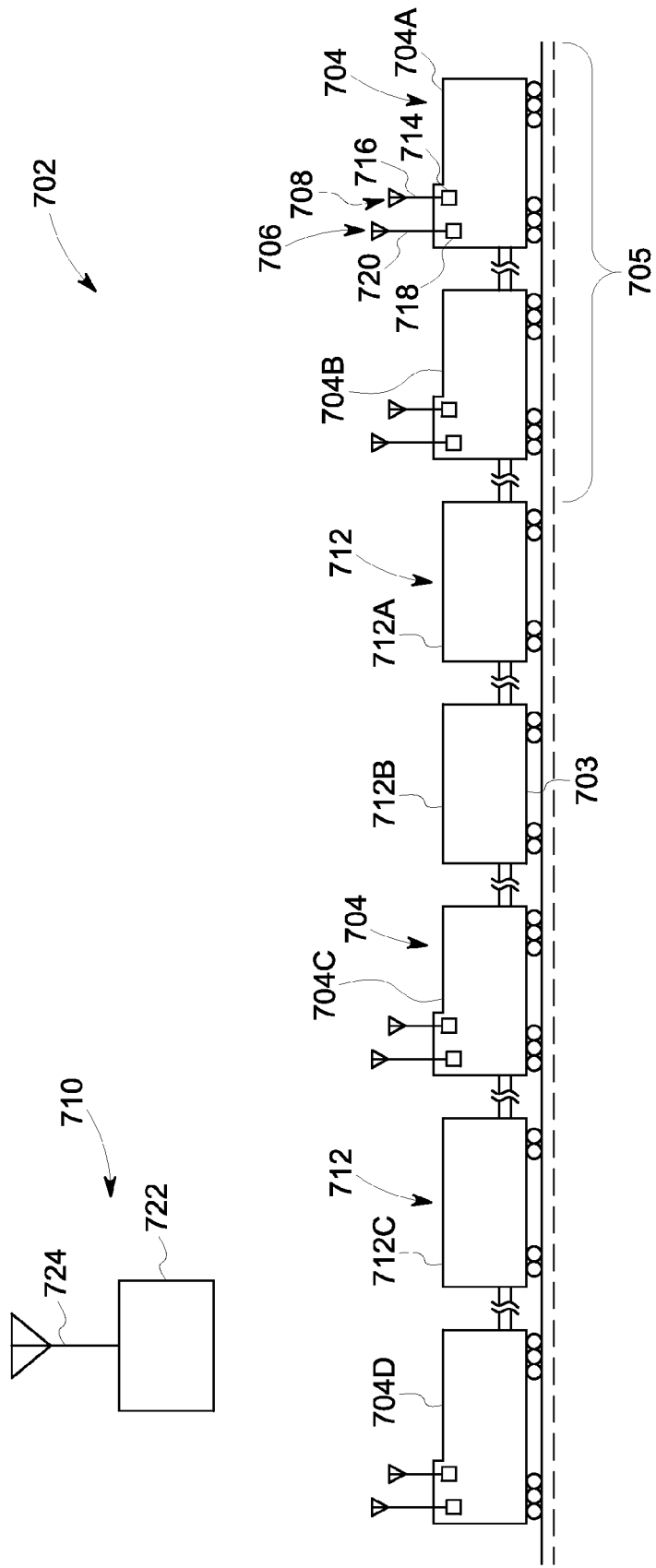
FIG. 7 schematically illustrates a communication system including a vehicle system and an off-board signaling device in accordance with an embodiment.

FIG. 7 schematically illustrates a communication system 700 including a vehicle system 702 and an off-board signaling device 710 in accordance with an embodiment. The vehicle system 702, traveling along a route 703, includes two or more propulsion-generating vehicles 704 (e.g., vehicles 704A-D) that are mechanically interconnected with each other in order to travel along the route 703 together. Two or more of the propulsion-generating vehicles 704 may be directly connected to form a group or consist 705, as illustrated in FIG. 7. Additionally, one or more propulsion-generating vehicles 704 may optionally be spaced apart from other propulsion-generating vehicles 704, and directly connected instead to one or more non-propulsion-generating vehicles 712 (e.g., vehicles 712A-C). The non-propulsion-generating vehicles 712 may be configured to carry a load for transport and are propelled along the route 703 by the propulsion-generating vehicles. The number and arrangement of the propulsion-generating vehicles 704 and non-propulsion-generating vehicles 712 illustrated in FIG. 7 is merely an example, as other embodiments of the inventive subject matter may use different vehicle 704, 712 arrangements and/or different numbers of vehicles 704 and/or 712. For example, the vehicle system 702 may include a greater proportion of non-propulsion-generating vehicles 712 to propulsion-generating vehicles 704.

The propulsion-generating vehicles 704 supply motive power and braking action for the vehicle system 702. Tractive and braking efforts for the vehicle system 702 may be coordinated and shared among the propulsion-generating vehicles 704. In one embodiment, one propulsion-generating vehicle 704 is designated as a lead (or active) unit. The lead unit issues command messages to one or more propulsion-generating vehicles 704 designated as remote units. The command messages may be transmitted wirelessly as local data signals from the lead unit to the remote units. The command messages may include, for example, messages ordering the remote units to apply, increase, or decrease tractive efforts or to apply, increase, or decrease braking efforts. In one embodiment, the command messages may be DP commands that coordinate control of tractive effort and/or braking by partitioning the required motive output among the propulsion-generating vehicles 704 in the vehicle system 702. In transmitting the command messages, the lead unit may operate to delegate to each of the remote units or consists a requested motive output. For example, to slow the vehicle system 702, the lead unit may command the remote units to apply braking efforts. The requested motive output commands may vary among the propulsion-generating vehicles 704.

The lead unit may optionally be the front propulsion-generating vehicle 704A in the vehicle system 702. Or, the lead unit may be located elsewhere. In the illustrated arrangement where the lead unit is the front propulsion-generating vehicle 704A, the propulsion-generating vehicles 704C and 704D may be remote units, while vehicle 704B forms a consist with the lead unit 704A. In other embodiments the lead unit may be a propulsion-generating vehicle 704 located away from the front of the vehicle system 702, such as vehicles 704B, 704C, or 704D. It should be noted that all propulsion-generating vehicles 704 may be substantially similar in form, with each having the operative capability to serve as the designated lead unit. For illustrative purposes only, the lead unit will hereafter be referred to as propulsion-generating vehicle 704A, while the remote units will be referred to as 704C-D.

In one embodiment, the vehicle system 702 may be a train configured to operate on rails. In this embodiment, the propulsion-generating vehicles 704 may be locomotives interspersed among a plurality of rail cars (e.g., the non-propulsion vehicles 712) throughout the length of the train to supply motive power and braking action for the train. In other embodiments, the propulsion-generating vehicles 704 may be other off-highway vehicles (e.g., mining vehicles and other vehicles that are not designed for or permitted to travel on public roadways), automobiles (e.g., vehicles that are designed for traveling on public roadways), marine vessels, and the like.

The propulsion-generating vehicles 704 may include two or more wireless communication devices disposed onboard the propulsion-generating vehicle 704, such as a remote wireless communication device 706 and a local wireless communication device 708. The remote wireless communication devices 706 are configured to communicate both remote data signals and local data signals. Data signals as used herein may include audio signals such as voice signals, video signals, digital data signals, and the like. The remote data signals are transmitted from locations off-board the vehicle system 702 (e.g., other vehicle systems, dispatch facilities, wayside transponders, and the like), while the local data signals are transmitted between propulsion-generating vehicles 704 on the vehicle system 702 itself. The remote wireless communication devices 706 may include transceivers 718, antennas 720, and associated circuitry and software. In one embodiment, the remote wireless devices 706 can represent PTC/ACC devices having multiple antennas and transceiving circuitry such that the devices 708 can wirelessly communicate data signals using different communication techniques (e.g., Wi-Fi, cellular, etc.). For example, each of the transceivers 718 can represent multiple transceivers and each of the antennas 720 can represent multiple antennas that can wirelessly communicate using different respective techniques (e.g., one transceiver and antenna set for Wi-Fi, another transceiver and antenna set for cellular, etc.). The remote wireless devices 706 include a bandwidth which allows the remote data signals to be transmitted on various frequencies, which allows for simultaneous transmission of multiple control signals. The remote wireless communication devices 706 may be configured with long ranges in order to receive remote data signals sent from remote sources located relatively far away. For example, the remote wireless communication device 706 may have a range up to 40 miles or more. For example, the remote data signals may be transmitted at high frequency ranges (e.g., around 3-30 MHz) and/or very high frequency ranges (e.g., around 30-300 MHz) to allow for such long-range transmission. In an embodiment, the remote wireless communication device 706 may be a radio device (e.g., a 220 MHz radio, a 12R3D radio, or the like), with the ability to receive and send remote and local data signals sent along various frequencies and channels.

In the illustrated embodiment, the remote wireless communication devices 706 on the propulsion-generating vehicles 704 are configured to communicate with an off-board signaling device 710 that is located remotely from the vehicle system 702. The off-board signaling device 710 may also include a transceiver 722, an antenna 724, and associated circuitry and software. The off-board signaling device 710 may be located at a command dispatch, on another vehicle system, at various route locations, or the like, within range of the remote wireless communication devices 706. The off-board signaling device 710 communicates with the remote wireless communication devices 706 by sending remote data signals.

The remote data signals may contain embedded control signals. The control signals may relate to matters that affect the operation of the vehicle system 702. For example, the control signals may warn an operator of the vehicle system 702 of a changing route condition, such as a change in the speed limit, an upcoming section of the route being occupied by another vehicle system, an upcoming section of the route being damages, and the like. The remote data signals communicated from the off-board signaling device 710 may be useful along congested areas of the route, such as in urban areas.

In an embodiment, the remote data signals may be positive train control (PTC) signals. For example, the off-board signaling device 710 may be a wayside transponder installed at various block points and/or route locations that send PTC signals to the vehicle system 702 when the vehicle system 702 is near (e.g., within a designated range) to the wayside transponder. The PTC signals may warn of a change in an authorized speed limit for an upcoming section of the route. The remote wireless communication devices 706 on the propulsion-generating vehicles 704 receive the PTC signals. In response, the propulsion-generating vehicles 704 may autonomously adjust tractive efforts and/or braking efforts according to the communicated speed limit. Furthermore, the propulsion-generating vehicles 704 may adjust the tractive effort by coordinating efforts using the local wireless communication devices 708 to communicate local data signals, as described below.

The local data signals are communicated between propulsion-generating vehicles 704 on the vehicle system 702. The local data signals may contain embedded control signals to coordinate tractive efforts and braking efforts among the propulsion-generating vehicles 704. The control signals may be transmitted and received in the form of voice messages or data messages. The control signals may relate to functions local to the vehicle system 702, such as operational control signals used to direct the tractive and braking efforts of the propulsion-generating vehicles 704 and safety control signals used to stop movement of the propulsion-generating vehicles 704 when one or more safety regulations are violated. Additional local data signals may include confirmation signals sent to acknowledge receipt of a received control signal and status signals sent to communicate a current status of a propulsion-generating vehicles 704 and operating parameters of machinery thereof (e.g., the actual power outputs generated by other propulsion-generating vehicles, lubricant and/or water temperatures, and the like). In an embodiment, the local data signals may be DP signals sent between lead and remote units to allocate power outputs for tractive and braking efforts among the propulsion-generating vehicles 704 on the vehicle system 702 when the total power output is distributed.

The local wireless communication devices 708 are disposed onboard the propulsion-generating vehicles 704, and are configured to communicate local data signals between the propulsion-generating vehicles 704 in the vehicle system 702. The local wireless devices 708 each include a transceiver 714, an antenna 716, and associated circuitry and software, which allow the local wireless devices 708 to both send and receive wireless signals, such as through RF links and the like. In one embodiment, the local wireless devices 708 can represent PTC/ACC devices having multiple antennas and transceiving circuitry such that the devices 708 can wirelessly communicate data signals using different communication techniques (e.g., Wi-Fi, cellular, etc.). For example, the transceiver 714 can represent multiple transceivers and the antenna 716 can represent multiple antennas that can wirelessly communicate using different respective techniques (e.g., one transceiver and antenna set for Wi-Fi, another transceiver and antenna set for cellular, etc.). The local wireless devices 708 include a bandwidth which allows the local data signals to be transmitted on various frequencies and channels, which allows for simultaneous transmission of multiple control signals. For example, the remote data signals may be transmitted at medium frequency ranges (e.g., around 300 kHz-3 MHz) and high frequency ranges (e.g., around 3-30 MHz) to allow for such transmission between propulsion-generating vehicles 704 that may be spaced up to a mile or more apart along the vehicle system 702. In an embodiment, the local wireless device 708 may be a radio device.

In an embodiment, remote and local data signals may be transmitted simultaneously using different frequencies, channels, or timing patterns, among others. For example, remote data signals for off-board communications may be transmitted along a bandwidth at higher frequencies than the local data signals are transmitted for onboard communications. In an embodiment, the remote wireless device 706 may be configured with a larger bandwidth than the local wireless device 708 on a propulsion-generating vehicle 704. Therefore, even if the bandwidth of the local wireless device 708 is congested, the remote wireless communication device 706 may be able to communicate at frequencies beyond the range of the local wireless device 708 (e.g., at frequencies above the upper limit of the local wireless communication device available bandwidth).

The local wireless communication devices 708 may transmit DP control signals among the propulsion-generating vehicles 704. For example, the propulsion-generating vehicle 704 designated as lead unit 704A may send a control signal to change tractive effort provided by one or more designated remote units 704C-D. The local wireless communication device 708 on the lead unit 704A may send a series of such control signals to ensure the receipt by the local wireless communication devices 708 on the remote units 704C-D. Upon receipt, the remote units 704C-D may be configured to implement the control signals and use the local wireless communication devices 708 to send confirmation signals back to the lead unit 704A. For example, the control signal may have originally been sent by the off-board signaling device 710 as a remote data signal received by the remote wireless communication device 706 on the lead unit 704A, and transmitted to the remote units 704C-D as a local data signal using the local wireless communication devices 708.

Figure 8:
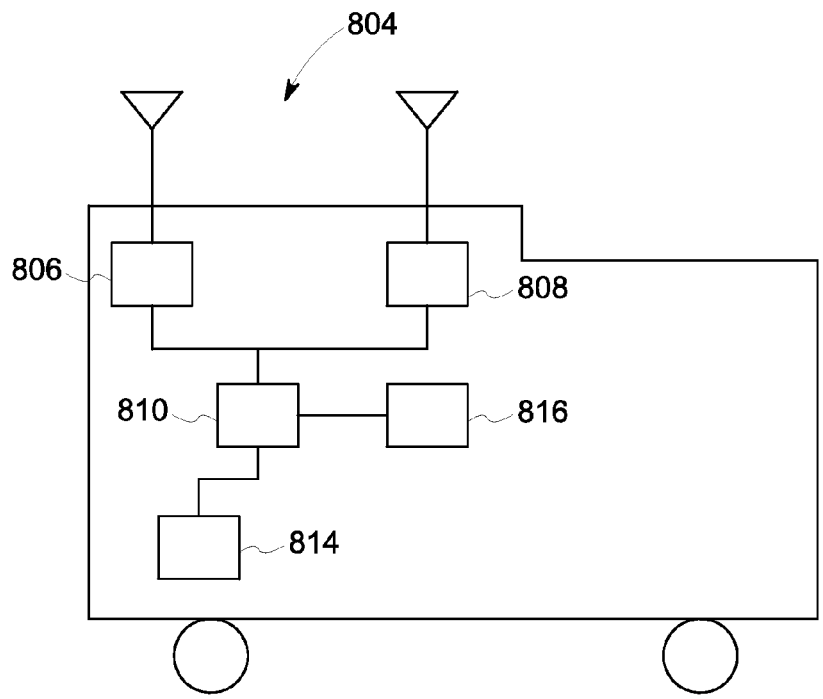
FIG. 8 schematically illustrates a propulsion-generating vehicle in accordance with an embodiment.

FIG. 8 schematically illustrates a propulsion-generating vehicle 804 in accordance with an embodiment. The propulsion-generating vehicle 804 may represent one or more of the propulsion-generating vehicles 704 (shown in FIG. 7) disposed on the vehicle system 702. The propulsion-generating vehicle 804 includes both a remote wireless communication device 806 and a local wireless communication device 808 located onboard the vehicle 804. The remote and local wireless communication devices 806, 808 may represent the respective remote and local wireless communication device 706, 708 (both shown in FIG. 7). The propulsion-generating vehicle 804 also includes a controller 810 operatively and electrically connected to the remote and local wireless communication devices 806, 808. The controller 810 may also be operatively and electrically connected to a propulsion system 814 on the propulsion-generating vehicle 804. Additionally, the controller 810 may connect to one or more input and/or output devices 816 ("Input/Output 816" in FIG. 8) onboard the vehicle 804.

The propulsion system 814 can represent one or more engines, motors, brakes, batteries, cooling systems (e.g., radiators, fans, etc.), and the like, that operate to generate power and propel the vehicle system 702. For example, the propulsion system 814 supplies motive power to propel the vehicle system 702 during a tractive effort, and supplies braking power to slow the vehicle system 702 during a braking effort. The type and amount of power for the propulsion system 814 to supply is controlled by the controller 810. One or more propulsion systems 814 may be provided onboard the propulsion-generating vehicle 804.

The input and/or output devices 816 may include one or more keyboards, throttles, switches, buttons, pedals, microphones, speakers, displays, and the like. The input and/or output devices 816 may be used by an operator to provide input and/or monitor output of one or more systems of the vehicle system 702. For example, a display may show an operator a readout of a received control signal, a sent control signal, and/or an activity of the propulsion system 814 in response to a control signal. This information may also be sent to a remote location, such as at a dispatch, where the information is shown on a remote display. The devices 816 may include a user interface configured to receive input control signals from an operator in the propulsion-generating vehicle 804. For example, the operator may use the user interface to increase the velocity of the vehicle system 702. The input command on the user interface is conveyed to the controller 810, which carries out the command by, for example, conveying a control signal to the propulsion system 814 to increase tractive efforts.

The controller 810 is configured to control operations of the vehicle system 702. A vehicle system or consist may include only a single propulsion-generating vehicle that includes the controller 810 as described herein. The other propulsion-generating vehicles in the vehicle system and/or consist may be controlled based on instructions received from the propulsion-generating vehicle 804 that has the controller 810. Alternatively, several propulsion-generating vehicles 804 may include the controllers 810 and assigned priorities among the controllers 810 may be used to determine which controller 810 controls operations of the propulsion-generating vehicles 804. For example, an overall vehicle control system may include two or more of the controllers 810 disposed onboard different propulsion-generating vehicles 804 that communicate with each other to coordinate operations of the vehicles 804 as described herein.

The controller 810 performs various operations. The controller 810 may represent a hardware and/or software system that operates to perform one or more functions described herein. For example, the controller 810 may include one or more computer processor(s) or other logic-based device(s) that perform operations based on instructions stored on a tangible and non-transitory computer readable storage medium. Alternatively, the controller 810 may include one or more hard-wired devices that perform operations based on hard-wired logic of the devices. The controller 810 shown in FIG. 8 may represent the hardware that operates based on software or hardwired instructions, the software that directs hardware to perform the operations, or a combination thereof.

As illustrated in FIG. 8, the controller 810 may operatively and electrically connect to wireless communication devices 806, 808, the propulsion system 812, and the input and/or output devices 816, among other systems and devices, on the propulsion-generating vehicle 804. The controller 810 also controls the propagation of control signals between these devices and systems. In one embodiment, the controller 810 may receive signals from the remote wireless communication device 806, the local wireless communication device 808, and the input devices 816, among others. After receiving the signals, the controller 810 then determines a proper course of action, which could be based on a control algorithm. The control algorithm may assign priorities to received control signals, such that for example direct inputs from the input devices 816 take precedent over received remote control signals, which take precedent over received local control signals. Proper courses of action for the controller 810 in response to control signals could include having the remote wireless communication device 806 and/or the local wireless communication device 808 transmit data signals, ordering the propulsion system 814 to increase or decrease tractive or braking efforts, and/or displaying the determined course of action on the output devices 816, among others.

For example, when a remote data signal is received by the remote wireless communication device 806, the communication device 806 conveys the signal to the controller 810. In response, if the remote data signal is a control signal to decrease the speed of the vehicle system 802, the controller 810 is configured to signal the propulsion system 814 to increase braking efforts accordingly. In addition, the controller 810 may display the current speed of the vehicle system 802 or other information on a display output device 816 for an operator to view. Furthermore, the controller 810 may control the remote wireless communication device 806 to send a confirmation signal back to the off-board location that was the source of the remote data signal. The controller 810 may also control the local wireless communication device 808 to send local data signals to other propulsion-generating vehicles 804 on the vehicle system 802 with a control signal to also increase braking efforts.

In another example, when the controller 810 receives a local control signal from either the remote wireless communication device 806 or the local wireless communication device 808, the controller 810 may be configured, among other actions, to change one or more tractive or braking efforts of the propulsion system 814 on the propulsion-generating vehicle 804 in response to the control signal. In addition, the controller 810 may be configured to use the wireless communication devices 806, 808 to coordinate the tractive or braking efforts of the propulsion-generating vehicle 804 with other propulsion-generating vehicles and/or consists in the vehicle system 802.

In one embodiment, the remote wireless communication device 806 may be configured to communicate both remote data signals and local data signals. When the remote device 806 communicates remote data signals transmitted between the vehicle system 802 and an off-board location, the remote device 806 may be referred to as operating in an off-board communication mode. When the remote device 806 communicates local data signals between the propulsion-generating vehicles 804 of the vehicle system 802, the remote device 806 is operating in an onboard communication mode.

The off and onboard communication modes may or may not be exclusive. For example, in one embodiment, when the remote device 806 functions in the off-board mode it only communicates remote data signals, not local signals, and when the remote device 806 functions in the onboard mode it only communicates local signals, not remote signals until the mode switches. In other embodiments, the modes may not be exclusive and the remote device 806 may be configured to communicate both local and remote signals concurrently in one or either mode. For example, the communications may be interleaved or multiplexed, or the remote device 806 may have multiple transceivers to allow for concurrent signal communication.

The remote wireless communication device 806 may be controlled to switch between off-board and onboard communication modes. In one embodiment, when the remote wireless communication device 806 is in the off-board communication mode, the local data signals are transmitted between propulsion-generating vehicles 804 using the local wireless communication device 808 only. As such, the local data signals are transmitted on frequencies within the defined bandwidth of the local wireless communication device 808. Switching the remote wireless communication device 806 to the onboard mode augments the available bandwidth used to communicate local data signals for the vehicle system 802. For example, the remote wireless communication device 806 may have a wider bandwidth than the local wireless communication device 808 which allows the remote device 806 to communicate local signals at frequencies beyond the frequency range of the local device 808, such as at higher frequencies. As another example, the remote wireless communication device 806 may communicate local signals at different RF channels and/or at different timing patterns than the local wireless communication device 808. Therefore, local data signals may be transmitted between propulsion-generating vehicles 804 over a "separate path" using the remote wireless communication device 806, which eases bandwidth congestion.

As a result of relieved bandwidth congestion, additional and/or more complex local data signals may be transmitted when the remote wireless communication device 806 operates in the onboard mode. For example, with an increased bandwidth for local signals, each propulsion-designated vehicle 806 designated as a remote unit in a DP system may be able to send additional remote signals to the lead unit. If the lead unit were to request status updates, now each remote unit would be able to transmit its own status and also the statuses it has received from other remote units. The result would be less communication failure between the lead and remote units.

The controller 810, in an embodiment, is configured to control the switching of the remote wireless communication device 806 between the off-board and onboard communication modes. As such, the controller 810 determines whether the remote wireless communication device 806 communicates local data signals or remote data signals. The determination to switch may be based on a programmed setting in the controller 810, operator input through an input device 816, receipt of a signal to switch, and the like, as described herein.

When the remote wireless communication device 806 is in the onboard communication mode, both of the wireless communication devices 806, 808 are configured to receive and send local data signals. The types of local data signals communicated by each of the wireless communication devices 806, 808 may be the same or different. For example, the remote wireless communication device 806 may transmit a first type of local data signal while the local wireless communication device 808 transmits a second type, and each type may be used by the controller 810 to control different operations of the propulsion-generating vehicle 804. The controller 810 may be configured to determine which local data signals are transmitted by each wireless communication device 806 and 808 based on factors, such as the importance, size, and other characteristics of the local data signals to be transmitted, and the available bandwidth of the communication devices 806, 808 at the time.

For example, if the received local data signal contains a safety control signal (used to stop movement of the propulsion-generating vehicles 804 when one or more safety regulations are violated), the controller 810 may assign both wireless communication devices 806, 808 to communicate the safety control signal to other propulsion-generating vehicles 804 to enhance the propagation of the signal throughout the vehicle system 802 and lead to a quicker response time (e.g., stoppage time). However, if the received local data signal contains an operational control signal (e.g. increase tractive efforts), determined not to be as important as a safety control signal, the controller 810 may be configured to assign only the local wireless communication device 808 to further transmit the operational control signal. The remote wireless communication device 806 then has more bandwidth available to transmit potential upcoming received local and/or remote data signals.

In another example, if the received local data signal is determined to be large or complex (e.g., greater than a threshold data packet size or message size), the controller 810 may assign the remote wireless communication device 806 to transmit the signal when the remote device 806 is in the onboard communication mode because the remote device 806 may have extra bandwidth on which to transfer the large/complex signal. Conversely, if the received local data signal is small or simple (e.g., no larger than the threshold data packet size), the controller 810 may be configured to have the local wireless communication device 808 transmit the signal even if the remote wireless communication device 806 is in the onboard mode, because the extra bandwidth is not necessary in this situation.

The remote wireless communication device 806 is configured with the operative ability to receive and send signals within a range of up to 40 miles or more. In order to communicate at such large ranges, the remote wireless communication device 806 transmits data signals at a relatively large signal intensity. However, when the remote wireless communication device 806 operates in the onboard communication mode to transmit local data signals on the vehicle system 802, the range from the device 806 to the intended receivers of the signals (e.g., other propulsion-generating vehicles 804 on the same vehicle system 802) is much shorter, on the order of a less than a mile to a couple miles. Therefore, in an embodiment, the controller 810 is configured to reduce the transmission signal intensity of the remote wireless communication device 806 when the wireless device 806 switches from off-board to onboard communication mode. The transmission signal intensity is reduced because local data signals are generally only relevant to the vehicle system 802 itself. Transmitting local data signals with the same intensity as remote data signals would unnecessarily clog the RF airwaves, reducing the available bandwidth for other vehicle systems in the remote proximity.

Figure 9:
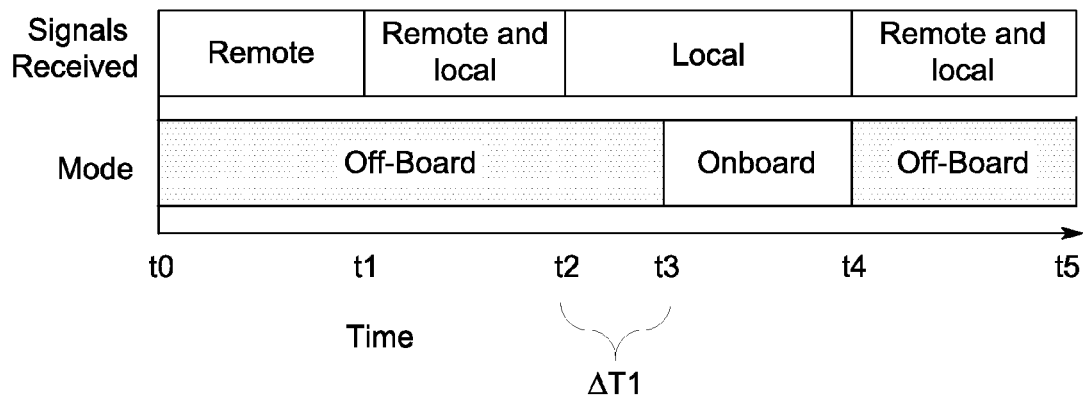
FIG. 9 illustrates a time diagram for operating a wireless communication device according to an embodiment.

FIG. 9 illustrates a timing diagram for operating the remote wireless communication device 806 according to one embodiment. The diagram shows modes of operation and signals received using the remote wireless communication device 806. In an embodiment, the remote wireless communication device 806 may switch between operating in the off-board communication mode and the onboard communication mode. The controller 810 may be configured to control the remote wireless communication device 806 and switch between the off-board and onboard communication modes.

Since both local and remote data signals may be received by the remote wireless communication device 806 within a common time period, the determination between operating in off-board communication mode and onboard communication mode in such a situation may be based on assigned priorities. The controller thereafter uses the assigned priorities to cause the propulsion-generating vehicle 804 to operate according to the remote data signals or the local data signals, whichever has priority.

In an embodiment, the remote data signals are assigned a higher priority than the local data signals, so the remote wireless communication device 806 operates by default in the off-board communication mode. The remote data signals may be assigned priority because the remote signals may relate to emergency safety issues, such as a stalled vehicle in the route ahead, while the messages relayed by the local signals may not generally have similar safety implications. For example, the remote data signals may be PTC signals sent from a remote dispatch monitoring the statuses of many vehicle systems, so the remote signals could implicate safety considerations beyond the local vehicle system.

The remote wireless communication device 806 may be controlled to send and receive signals that are assigned a lower priority in certain prescribed situations. For example, even though remote data signals may be assigned priority over local data signals such that the remote wireless communication device 806 operates by default in off-board communication mode, the controller 810 may switch the remote device 806 to the onboard communication mode in certain prescribed situations. Such prescribed situations may include non-receipt of the priority data signals for a set period of time, operator input, and/or receipt of a priority signal commanding the switch, among others. Thus, in one embodiment, after non-receipt of remote data signals for at least a designated time period, the controller 810 may direct the remote wireless communication device 806 to switch from the off-board communication mode to the onboard communication mode. Once in the onboard communication mode, the remote wireless communication device 806 supplements and augments an available bandwidth for transmitting local data signals between propulsion-generating vehicles 804 on the vehicle system.

In another example, the controller 810 may be configured to direct the remote wireless communication device 806 to switch from the off-board communication mode to the onboard mode upon identifying an operating failure of the local wireless communication device 808 on board the propulsion-generating vehicle 804. Therefore, if the local wireless communication device 808 is inoperable or malfunctioning, such as due to a damaged antenna, transceiver, or a flaw in the associated software and/or circuitry, the remote wireless communication device 806 may act in place of the inoperable local device 808 by communicating local data signals, such as DP signals.

In one embodiment, even while the remote wireless communication device 806 transmits low-priority data signals, the remote device 806 continues to "listen" for high-priority signals. Once a high-priority data signal is received, the remote wireless communication device 806 may be controlled to switch communication modes in order to transmit the newly-received high-priority data signal. For example, continuing the example above, once the remote wireless communication device 806 receives a remote data signal, the remote device 806 conveys the signal to the controller 810, and the controller 810 switches the remote device 806 back to the off-board communication mode in order to transmit the received remote data signal.

An example process that shows the types of signals received by the remote wireless communication device 806 and the communication mode of the remote device 806 over a period of time is shown in FIG. 9. In the diagram, remote data signals take priority over local data signals, so the default communication mode is off-board. From time t0 to t1, only remote data signals are received by the remote wireless communication device 806, so the remote device is controlled to operate in the off-board mode to transmit the remote signals. From time t1 to t2, local data signals are also received along with remote data signals, but since the remote data signals have an assigned priority over the local data signals, the remote wireless communication mode continues to operate in the off-board mode, and does not transmit the received local data signals. From time t2 to t3, or ΔT1, only local data signals are received but the communication mode does not switch to onboard yet because ΔT1 represents a designated time period of non-receipt of priority signals before the controller 810 switches communication modes. Thereafter, the communication mode switches at time t3 to the onboard mode, and from time t3 to t4 the remote wireless communication mode augments the available bandwidth to transfer local data signals. Finally, at time t4 another remote data signal is received by the remote wireless communication device 806, and the controller 810 automatically switches communication modes back to the off-board mode in order to transfer the received remote signals according to the assigned priority.

Figure 10:
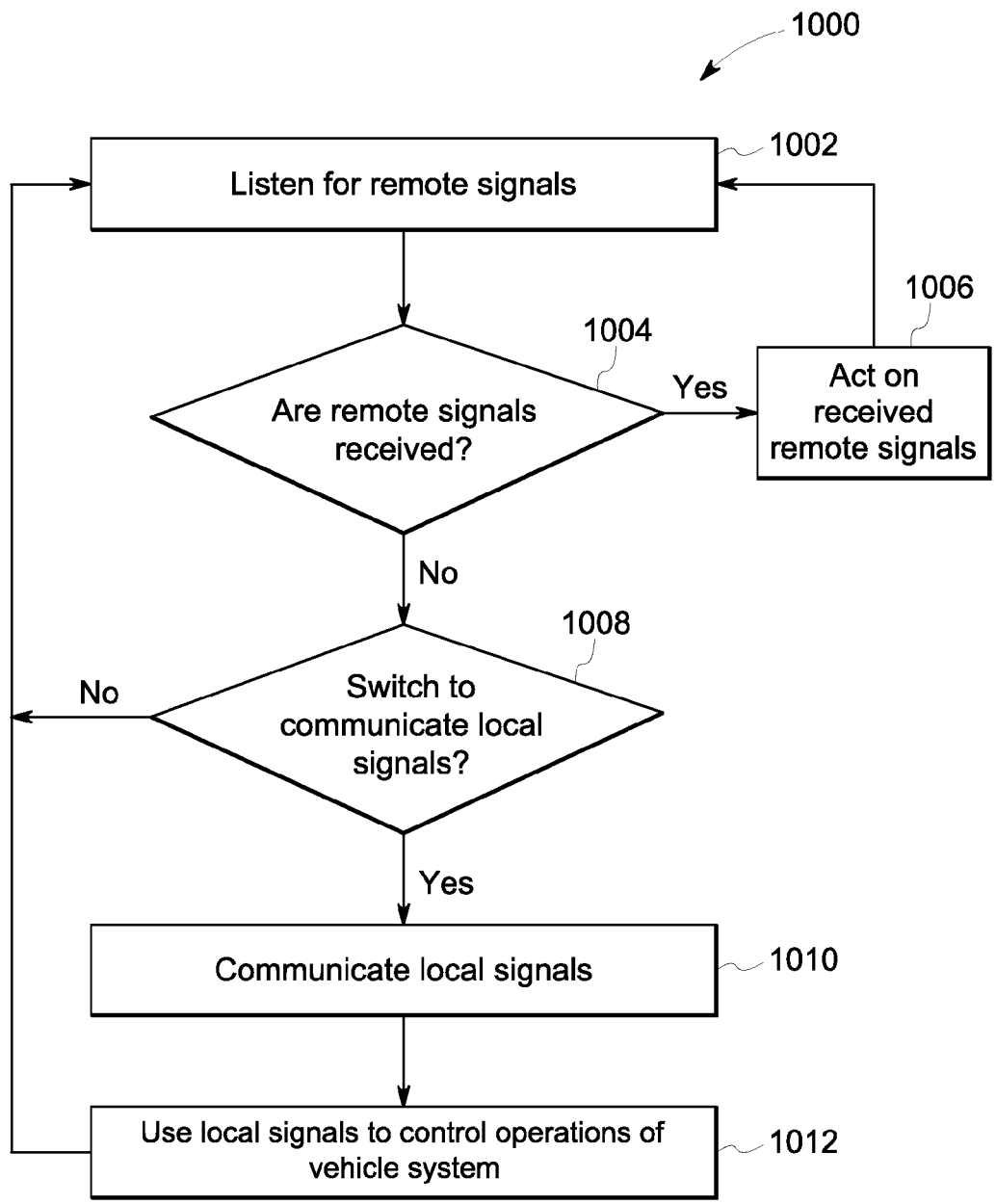
FIG. 10 is a flow diagram illustrating a signal communication method according to an embodiment.

FIG. 10 illustrates a flowchart of one embodiment of a method 1000 of communicating signals for vehicle system 702. The method 1000 is described in connection with the vehicle system 702 as shown in FIG. 7 described herein. At 1002, as the vehicle system 702 travels along the route 703, the vehicle system 702 listens for remote signals. For example, the remote wireless communication device 706 disposed onboard one or more of the propulsion-generating vehicles 704 listens for remote data signals being transmitted from locations off-board the vehicle system 702, such as PTC signals sent from a dispatch location.

At 1004, a determination is made as to whether remote signals are being received. For example, any remote signals received by the remote wireless communication device 706 may be conveyed to the controller 810 (shown in FIG. 8) for further action in response to the received remote signal. The remote signal may be related to a safety concern, so the vehicle system 702 may be configured to take prompt action to implement any messages received via remote signals. If the vehicle system 702 has received remote signals, then flow of the method 1000 may proceed to 1006.

At 1006, the vehicle system 702 acts on the received remote signal. The controller 810 may act by performing a variety of functions, including, for example, displaying a readout on a display of an output device 816 (shown in FIG. 8), controlling the propulsion system 814 (shown in FIG. 8) to increase or decrease tractive efforts or braking efforts, operating the local wireless communication device 708 to transmit signals (e.g., the received remote signal and/or additional signals) to other communication devices on the vehicle system 702, and operating the remote wireless communication device 706 to send a response signal back to the source of the received remote signal. After acting on the received remote signal, flow of the method may return to 1002 where the remote wireless communication device 706 continues to listen for remote signals.

Referring again back to 1004, if the vehicle system 702 has not received remote signals, then flow of the method 1000 may proceed to 1008. At 1008, since the remote wireless communication device 706 has not recently (e.g., within the last cycle of the method 1000) received a remote signal, a determination is made as to whether the communication device 706 should switch to communicate local signals. If no remote signals are being received, the remote wireless communication device 706 may be used to supplement the local wireless communication device 708 communicating local data signals between the propulsion-generating vehicles 704 of the vehicle system 702. However, it may not be desirable to always switch the remote wireless communication device 706 upon every determination that remote signals have not been received, as such operation could result in frequent switching which could exhaust and/or damage the controller 810, wireless device 706, and other associated hardware.

In an embodiment of the method 1000, the controller 810 may determine to switch the remote wireless communication device 706 to communicate local signals after a designated time period of non-receipt of remote signals. In this embodiment, if the amount of time from the last received remote data signal to the present time does not meet or exceed the designated time period, the determination to switch is determined in the negative. The determination whether to switch or not may also be controlled by an operator's input, a received command signal, and the like. When the determination to switch at 1008 is negative, the flow of the method 1000 returns to 1002 to listen for remote signals. When the determination to switch at 1008 is positive, such as if the designated time period of non-receipt has been met, for example, the flow of the method proceeds to 1010.

At 1010, the remote wireless communication device 706 is directed to communicate local signals. Although local signals may have a lower assigned priority than remote signals, since no remote signals have been received, the remote communication device 706 may be used to supplement the local wireless communication device 708, at least until higher priority remote signals are received. Using the remote communication device 706 to communicate local signals between propulsion-generating vehicles 704 disposed along the vehicle system 702 may relieve transmission congestion and free up bandwidth for additional signals that may reduce the number of messages that get lost in transmission. The controller 810 may coordinate the transmission of local signals, such as DP signals, between the remote and local communication devices 706, 708. After the local signals are communicated at 1010 using the remote wireless communication device 706 and/or the local wireless communication device 708, the flow of the method 1000 proceeds to 1012.

At 1012, the transmitted local signals are used to control operations of the vehicle system 702. For example, the local signals may be DP signals transmitted from a propulsion-generating vehicle 704 acting as a lead unit to one or more remote units in order to coordinate a total power output by allocating certain desired power outputs to the remote unit(s). After the remote wireless communication device 706 has communicated the local signals at 1010, and the local signals have been implemented to control operations of the vehicle system 702 at 1012, the flow of the method 1000 returns to 1002 so the remote communication device can listen for remote signals 1002. If no remote signals are received at 1004, then once again the determination may be made at 1008 to have the remote communication device 706 communicate local data signals since, for example, the time period since last receipt of remote signals will still exceed the designated time period.

In one embodiment, the vehicles in the vehicle consists and vehicle systems described herein may use the PTC/ACC devices to communicate. Use of the PTC/ACC devices can eliminate the use of radio RF communication between the vehicles, which also can eliminate the need for radio RF circuitry onboard the vehicles that are dedicated for inter-vehicle communication. For example, some vehicle systems or consists may include vehicles having wireless communication circuitry that is only used for radio (e.g., RF) communication between the vehicles to allow the vehicles to remotely control other vehicles or to be remotely controlled by other vehicles. The radio communication may require that a line of sight exists between two antennas that are communicating signals using radio communication. Placing PTC/ACC devices onboard the vehicles can allow for the radio equipment used to communicate signals between the vehicles to be eliminated or removed. Optionally, the PTC/ACC devices can both wirelessly receive data for PTC control of the vehicles (e.g., movement authorities, location authorities, speed restrictions, etc.) and to wirelessly communicate between the vehicles for remote control of the vehicles using wireless communication according to the IEEE 802.11 (2012) standard, a copy of which is submitted with this application and the entire disclosure of which is incorporated herein by reference.

Some vehicle systems communicate the distributed power signals described herein using two independent and separate radio communication devices. For example, some vehicle systems may include vehicles with radios in order to maintain communication redundancy between the vehicles. But, the use of radio RF data communication between the vehicles can suffer from temporary and extended communication losses in various conditions, such as terrains that prevent radio signals reaching the certain vehicles, curves that impede lines of sight between the communication devices, or the like. The radio communication devices may communicate using frequencies other than the IEEE 802.11 frequency bands (e.g., the 2.4 GHz, 3.6 GHz, 4.9 GHz, 5 GHz, and 5.9 GHz bands).

Figure 11:
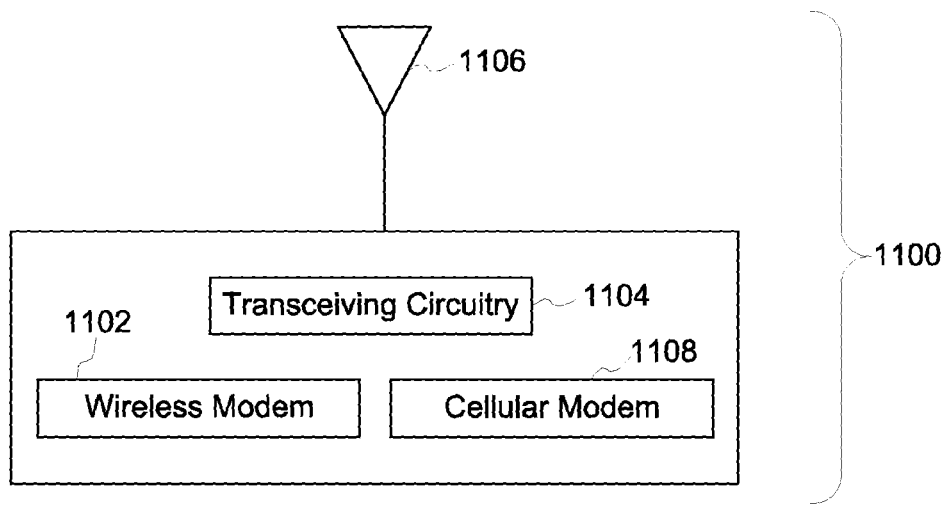
FIG. 11 illustrates a wireless communication device according to one embodiment.

FIG. 11 illustrates a wireless communication device 1100 according to one embodiment. The device 1100 can represent a PCT/ACC device described above, and may be disposed onboard the vehicles described herein. For example, the device 1100 may be disposed onboard the vehicles 104, 140 to replace or augment the communication devices 120, 142 shown in FIG. 1, onboard the vehicles 704 to replace or augment one or more of the communication devices 706, 708 shown in FIG. 7, and/or onboard the vehicles 804 to replace or augment one or more of the communication devices 806, 808.

The device 1100 includes an antenna 1106 that is operably connected with data modems 1102, 1108 and transceiving control circuitry 1104. The antenna 1106 may represent a single antenna or multiple antennas. The modems 1102, 1108 represent circuitry that modulates data signals to digitally encode information in the signals for communication from the device 1100 to other devices (e.g., via the antenna 1106) and that demodulates received data signals to extract information that is digitally encoded in the received data signals (e.g., via the antenna 1106). The transceiving control circuitry 1104 can represent hardware circuitry that controls operation of the modem 1102 and antenna 1106, such as one or more processors, integrated circuits, field programmable gate arrays, application specific integrated circuits, or the like. The combination of the data modem 1102 and the transceiving control circuitry 1104 can be referred to as a wireless communication module of the PTC ACC device 1100.

The modems 1102, 1108 in the PTC ACC device can operate as a single modem or dual modem and wirelessly communicate data signals. The modem 1102 may communicate data signals via the antenna 1106 using the IEEE 802.11b/g/n standards, and may therefore be referred to as a wireless modem. The modem 1108 may communicate cellular data signals and therefore be referred to as a cellular modem. The modems 1102, 1108 may use the same or different antennas 1106.

The modems 1102, 1108 can concurrently or simultaneously communicate different types of wireless data signals with the same or different locations. For example, in one embodiment, the modem 1108 can communicate cellular signals with the off-board location 710 (shown in FIG. 7), such as a dispatch center, a signaling tower, or other signaling device using a cellular network while the modem 1102 also is communicating Wi-Fi™ signals or other signals with other devices 1100 onboard other vehicles in the same vehicle system (e.g., for DP control of the vehicles) using a wireless network. The wireless network may include a network that does not communicate cellular signals. Such a wireless network may use internet protocol to communicate messages, and can include one or more routers, access points, etc., to form the network.

The modems 1102, 1108 may use the same antenna 1106 to communicate the different types of signals, such as by using different time slots to communicate the different types of signals. Alternatively, the device 1100 may include multiple antennas 1106 for communicating different types of signals. The device 1100 can receive PTC signals from the off-board signaling device 710 during the same time period that the device 1100 also communicates DP signals to and/or from other vehicles.

Using the device 1100 to both communicate with the off-board device 710 and with other vehicles can allow for other communication devices to be removed or not installed onboard the vehicle. For example, the device 1100 can receive the PTC signals via Wi-Fi™ communication while also communicating DP signals via cellular communication, thereby eliminating the need for separate communication devices such as the communication devices 120, 142, 706, 708, 806, 808. The reduction in the number of communication devices onboard a vehicle system can reduce the cost and/or complexity of communication systems of the vehicle systems The multiple modem 1102, 1108 embodiment of the device 1100 can provide additional redundancy for communications with or among vehicles in a vehicle system. For example, the modem 1102 can wirelessly communicate with the off-board device 710 in order to receive the PTC signals. In the event that the modem 1102 fails or is otherwise unable to receive the PTC signals, the modem 1108 may communicate with the off-board device 710 to receive the PTC signals. For example, the device 710 may communicate the PTC signals using wireless signals and/or cellular signals to ensure that the PTC signals are received. In one embodiment, the term wireless signals means signals communicated according to or using the IEEE 802.11 (2012) standard.

In one aspect, the device 1100 can switch between which modem 1102, 1108 is used to communicate data signals between vehicles (e.g., for communication of DP signals) and/or to communicate with off-board devices 710 based on financial communication costs. During travel through areas having publicly available wireless networks (such as urban areas), the devices 1100 onboard the vehicles in a vehicle system can switch from using the cellular modem 1108 to communicate inter-vehicle signals (e.g., DP signals or other signals) to using the wireless modem 1102 to communicate the inter-vehicle signals. Communicating using the cellular model 1108 may incur financial costs from the cellular service provider, while communicating using the wireless modem 1102 in a location having a free or lower cost wireless network may incur no financial costs or less financial cost.

The control circuitry 1104 can determine when to switch the modem 1102, 1108 being used and/or a user or operator of the device 1100 can switch which modem 1102, 1108 is being used based on the financial costs of communicating via the different modems 1102, 1108. For example, the control circuitry 1104 or one or more of the processors described herein can determine the location information of a vehicle or vehicle system and compare this location to a list, table, database, or other memory structure stored in a memory (not shown) of the device 1100 and/or the vehicles. The memory structure may provide locations and associated financial costs of communicating via the cellular modem 1108 in those locations, a list of locations where communication via the cellular modem 1108 is not permitted due to the financial costs, or a list of locations where communication via the cellular modem 1108 is to be used due to a lack of an alternate, less expensive wireless network. If the location information of the vehicle or vehicle system indicates that the vehicle or vehicle system is in a location where cellular communication is not to be used (e.g., due to the cost exceeding a threshold or due to availability of a wireless network), then the control circuitry 1104 may stop using the cellular modem 1108 and switch to using the wireless modem 1102 for communicating.

The device 1100 can switch between which modem 1102, 1108 is used to communicate data signals between vehicles (e.g., for communication of DP signals) and/or to communicate with off-board devices 710 based on communication capabilities of the modems 1102, 1108. During travel through certain locations, such as tunnels, curves, urban areas, or the like, the wireless modem 1102 onboard one or more of the vehicles may not be able to communicate with other vehicles and/or off-board devices 710. The inability to communicate may be caused by wireless interference from other devices, a lack of a line-of-sight between the devices 1100, or other causes. In a situation where one modem 1102, 1108 loses the ability to communicate with another vehicle or device 710, the control circuitry 1104 can begin using the other modem 1102, 1108 to communicate. The control circuitry 1104 can detect when a modem is unable to communicate with another device in response to the modem not receiving an expected data signal, such as a response to a previous data signal sent by the modem. Alternatively, a user or operator of a vehicle may direct the control circuitry 1104 to change which modem 1102, 1108 is being used to communicate, such as by providing input to the control circuitry 1104 via an input device such as the input device 816 (shown in FIG. 8, which may be communicatively coupled with the control circuitry 1104).

In operation, the vehicle system having the devices 1100 onboard the vehicles in the vehicle system can be moving along a route with DP signals being communicated between the vehicles via the local communication devices 708. In order to switch to communicating the DP signals with the devices 1100, the controllers 810 onboard the vehicles in the vehicle systems identify the antennas 1106 of the devices 1100 onboard the vehicles. The controller 810 onboard a vehicle can identify the antenna 1106 of the device 1100 onboard the same vehicle by communicating a data signal to the control circuitry 1104 of the device 1100. The control circuitry 1104 can respond to this signal with a confirmation signal that identifies the antenna 1106.

The controller 810 and/or control circuitry 1104 of the device 1100 onboard the lead vehicle of the vehicle system can then wirelessly communicate a connection request message to the devices 1100 onboard the remote vehicles of the vehicle system. This connection request message can be communicated over a wireless network formed by the devices 1100 and using the wireless modems 1102 and antennas 1106 of the devices 1100. This wireless network can be referred to as an ACC network.

In response to receiving the connection request message at the remote vehicles (e.g., via the antennas 1106 and wireless modems 1102 of the devices 1100 onboard the remote vehicles), wirelessly communicate response messages using the antennas 1106 and wireless modems 1102. The response messages are communicated back to the antenna 1106 and wireless modem 1102 of the lead vehicle. In response to the response messages being received at the lead vehicle, one or more DP tests or checks may be performed. For example, the controllers 810 may determine the pressure in air brakes of the vehicle system (e.g., using one or more pressure transducers or other pressure sensors), check to determine if the brakes of the vehicles are currently applied, etc. If the tests of checks are passed (e.g., there is at least a threshold amount of pressure in the air brakes, the brakes are currently applied, etc.), then the devices 1100 onboard the lead and remote vehicles can establish a permanent communication link with each other. A permanent communication link may be a communication link that remains established for an entire duration of a trip of the vehicle system, a link that is used for the communication of only a single type of message, or the like. The communication links may be established by the devices 1100 sharing network addresses of the devices 1100 in the ACC network (e.g., Internet protocol or media access control addresses) using point-to-point wireless connections. Each of the point-to-point wireless connections can be a wireless link between two devices 1100 over which data signals are communicated directly between the devices 1100 (e.g., without the data signals sent to a device 1100 at a destination address being received by another device 1100 or communication device and then repeated or otherwise routed to the device 1100 at the destination address).

Once the point-to-point connections are established, the devices 1100 may communicate the DP signals between and/or among the vehicles using the point-to-point connections. In the event that one or more of the point-to-point connections fails or is unusable (e.g., due to interference), one or more of the devices 1100 can switch to communicating the DP signals using the cellular modems 1108 and antennas 1106.

The devices 1100 can allow for the vehicles in a vehicle system to communicate with each other and/or with off-board devices in locations with different communication capabilities. For example, during travel in locations where cellular communications are not available (e.g., due to a lack of cellular towers), the devices 1100 can use the IEEE 802.11 communication standards to communicate with each other using the wireless modems 1102 and antennas 1106. During travel in locations where the cellular communications are available, the devices 1100 can use the cellular modems 1108 and antennas 1106 to communicate.

The modems 1102, 1108 in the devices 1100 can establish different communication links having different bandwidths. The cellular modems 1108 can establish cellular connections having larger bandwidth than the connections established by the wireless modems 1102. The wireless modems 1102 may be used for communication of the DP signals while the cellular modems 1108 are used to communicate other types of signals and data in order to avoid hindering the communication of the DP signals. For example, if the wireless modems 1102 are only used for communication of the DP signals and no other signals, then the absence of other data signals can improve the communication of the DP signals (e.g., fewer DP signals are dropped or not received than if the wireless modems 1102 communicated other data signals).

In one aspect, the devices 1100 can be used to switch between cellular and wireless networks (e.g., WiFi networks) depending on cellular and/or wireless network availability, and/or may switch between existing radio links and cellular or wireless networks based on the network availability. For example, instead of the devices 1100 entirely replacing the radios onboard a vehicle system that are used to communicate the DP signals between the vehicles, the devices 1100 may be used in conjunction with the radios as backups to the radios. In operation, the devices 1100 may use the cellular modems 1108 to communicate DP signals in areas where cellular networks are available. In response to the vehicle system entering an area where cellular communication is not available, the devices 1100 may determine whether a wireless network is available. If a wireless network is available, the devices 1100 may communicate using the wireless modems 1102. If a wireless network is not available, then the devices 1100 may cease communication of the DP signals and the radios may be used to communicate the DP signals via radio links, as described above. Responsive to a wireless network and/or cellular network subsequently becoming available (e.g., due to the vehicle system moving to a location where a wireless network and/or cellular network is available), the devices 1100 may return to communicating the DP signals using the respective wireless modems 1102 or cellular modems 1108.

Figure 12:
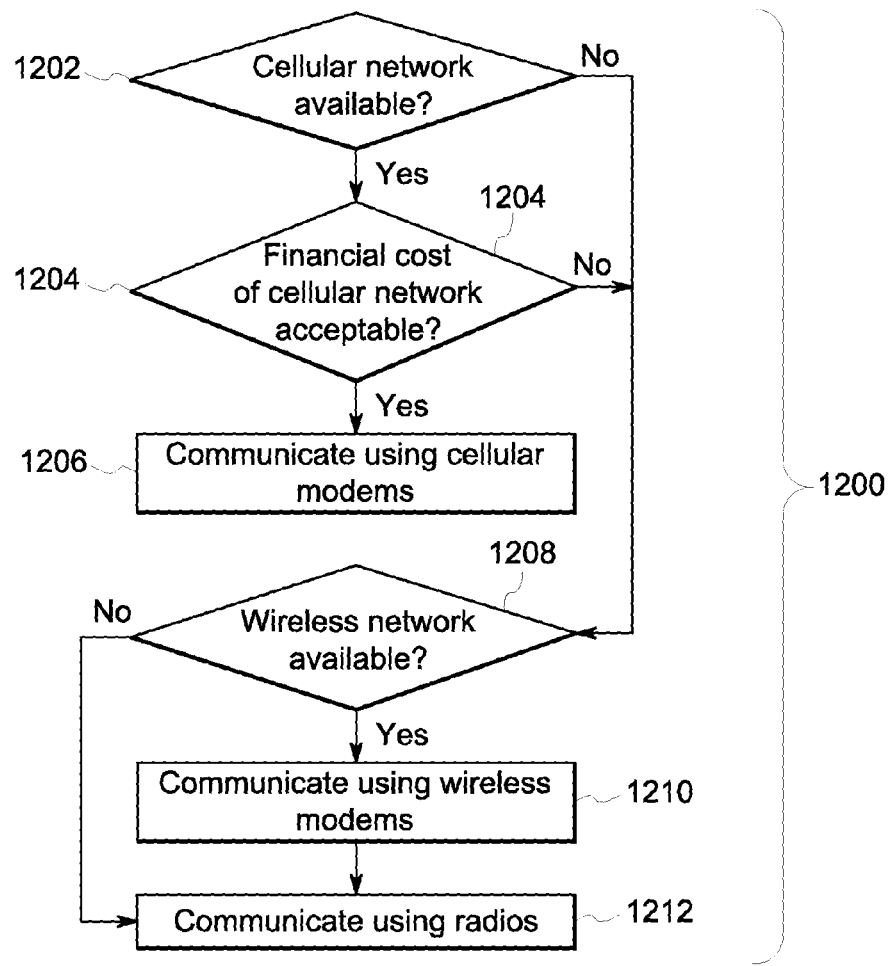
FIG. 12 illustrates a flowchart of a method for communicating using a multi-modem and/or multi-communication device system according to one embodiment.

FIG. 12 illustrates a flowchart of a method 1200 for communicating using a multi-modem and/or multi-communication device system according to one embodiment. The method 1200 may be used for communication between two or more locations (e.g., between vehicles in the same vehicle system) using multi-modem devices (e.g., the devices 1100), radios, or the like. The operations described in connection with the method 1200 may be performed by one or more of the devices 1100, the controllers, control systems, or the like, described herein. At 1202, a determination is made as to whether a cellular network is available. For example, the devices 1100 may determine if one or more cellular towers are available for communicating cellular signals and/or if the signal strength of the towers is sufficient for communicating signals (e.g., DP signals). If a cellular network is available, then flow of the method 1200 can proceed toward 1204. If a cellular network is not available, then flow of the method 1200 can proceed toward 1208.

At 1204, a determination is made as to whether a financial cost of using the cellular network is acceptable. As described above, use of different cellular networks may involve different costs for communicating cellular signals. If the cost of communicating the signals exceeds a designated threshold (which may be a threshold of no cost or a non-zero threshold), then the cost of communicating using the cellular network may be unacceptable and flow of the method 1200 may proceed toward 1208. If the cost of communicating the signals does not exceed the designated threshold, then the cost of communicating using the cellular network may be acceptable, and flow of the method 1200 can proceed toward 1206.

At 1206, signals are communicated using the cellular modems. For example, the cellular modems of the devices 1100 can be used to communicate DP signals or other signals between the vehicles. At 1208, a determination is made as to whether a wireless network is available. For example, the devices 1100 may determine if one or more WiFi or other internet protocol wireless networks are available. As described above, these networks may be available during travel of a vehicle system in or near residential areas or other areas where a wireless network is established. If a wireless network is available, then flow of the method 1200 can proceed toward 1210. If a wireless network is not available, then flow of the method 1200 can proceed toward 1212.

At 1210, signals are communicated using the wireless modems. For example, the wireless modems of the devices 1100 can be used to communicate DP signals or other signals between the vehicles using a WiFi or other wireless network that is not a cellular network. At 1212, signals are communicated using radios onboard the vehicle system. For example, if the devices 1100 are unable to communicate DP signals using the cellular modems or wireless modems, or if communicating the DP signals using the cellular modems is too expensive, then the radios onboard the vehicle system may be used to establish radio links and to communicate the DP signals via the radio links.

Flow of the method 1200 may be repeated one or more times. For example, the method 1200 may be repeated in order to determine what networks are available during travel in different locations and to switch which modem or radio is being used based on the network availability.

In one embodiment, a communication system includes a first wireless communication device and a controller. The first wireless communication device is configured to be disposed onboard a vehicle system having two or more propulsion-generating vehicles that are mechanically interconnected with each other in order to travel along a route together. The controller is configured to be disposed onboard the vehicle system and operatively connected with the first wireless communication device in order to control operations of the first wireless communication device. The controller is configured to direct the first wireless communication device to switch between operating in an off-board communication mode and operating in an onboard communication mode. When the first wireless communication device is operating in the off-board communication mode, the first wireless communication device is configured to receive remote data signals from a location that is disposed off-board of the vehicle system. When the first wireless communication device is operating in the onboard communication mode, the first wireless communication device is configured to communicate local data signals between the propulsion-generating vehicles of the vehicle system.

In one aspect, the remote data signals that are communicated from the location that is off-board of the vehicle system are control signals. The first wireless communication device is configured to receive the control signals and convey the control signals to the controller. The controller is configured to change one or more tractive efforts or braking efforts of the vehicle system in response to the control signals.

In one aspect, the control signals are PTC signals.

In one aspect, the local data signals that are communicated between the propulsion-generating vehicles are control signals. The first wireless communication device is configured to receive the control signals and convey the control signals to the controller. The controller is configured to coordinate one or more tractive efforts or braking efforts of the two or more propulsion-generating vehicles according to the control signals.

In one aspect, the control signals are DP signals.

In one aspect, the first wireless communication device is configured to receive both the remote data signals and the local data signals during a common time period. The controller is configured to cause the propulsion-generating vehicles to operate according to the remote data signals or the local data signals according to priorities assigned to the remote data signals and the local data signals.

In one aspect, the remote data signals are assigned with higher priorities than the local data signals.

In one aspect, the controller is configured to direct the first wireless communication device to switch from the off-board communication mode to the onboard communication mode after non-receipt of the remote data signals for at least a designated time period.

In one aspect, the first wireless communication device is a radio device.

In one aspect, a second wireless communication device is configured to communicate the local data signals between the propulsion-generating vehicles of the vehicle system so that the controller can coordinate one or more tractive efforts or braking efforts of the propulsion-generating vehicles with each other. The controller is configured to direct the first wireless communication device to switch to the onboard communication mode to augment an available bandwidth that is used to communicate the local data signals for the vehicle system.

In one aspect, the local data signals include operational control signals and safety control signals. The operational control signals are used to direct the one or more tractive efforts or braking efforts of the propulsion-generating vehicles. The safety control signals are used to stop movement of the propulsion-generating vehicles when one or more safety regulations are violated. The second wireless communication device is configured to communicate the operational control signals. The controller is configured to direct both the first wireless communication device and the second wireless communication device to communicate the safety control signals when the first wireless communication device is in the onboard mode of operation.

In one aspect, the controller is configured to direct the first wireless communication device to communicate the local data signals that are larger than a threshold data packet size when the first wireless communication device is in the onboard mode of operation. Meanwhile, the second wireless communication device is configured to communicate the local data signals that are no larger than the threshold data packet size.

In one aspect, the controller is configured to direct the first wireless communication device to communicate the local data signals of a first type when the first wireless communication device is in the onboard mode of operation. Meanwhile the second wireless communication device is configured to communicate the local data signals of a different, second type. The first and second types of the local data signals are used to control respective different operations of the propulsion-generating vehicles.

In one aspect, the vehicle system includes two or more vehicle consists with the propulsion-generating vehicles disposed in different ones of the vehicle consists. The controller is configured to direct the first wireless communication device to communicate the local data signals between the different vehicle consists.

In one aspect, the controller is configured to reduce a signal intensity at which the first wireless communication device transmits the local control signals responsive to the first wireless communication device being switched from the off-board communication mode to the onboard communication mode.

In one embodiment, a method includes directing a first wireless communication device configured to be disposed onboard a vehicle system to operate in an off-board communication mode. The vehicle system has two or more propulsion-generating vehicles that are mechanically interconnected with each other in order to travel along a route together. In the off-board communication mode, the first wireless communication device is configured to receive remote data signals from a location that is disposed off-board the vehicle system. The method also includes switching the first wireless communication device from operating in the off-board communication mode to operating in an onboard communication mode. In the onboard communication mode, the first wireless communication device is configured to communicate local data signals between the propulsion-generating vehicles of the vehicle system. The method further includes controlling movement of the vehicle system responsive to receipt of the remote data signals and responsive to receipt of the local data signals.

In one aspect, the first wireless communication device is configured to receive both the remote data signals and the local data signals during a common time period. Control of the propulsion-generating vehicles of the vehicle system is responsive to the remote data signals or the local data signals according to priorities assigned to the remote data signals and the local data signals.

In one aspect, the remote data signals are assigned with higher priorities than the local data signals.

In one aspect, switching the first wireless communication device to the onboard communication mode augments an available bandwidth that is used to communicate the local data signals for the vehicle system.

In one aspect, switching the first wireless communication device from the off-board communication mode to the onboard communication mode includes reducing a signal intensity at which the first wireless communication device transmits the local control signals.

In one embodiment, a communication system includes a controller. The controller is configured to be disposed onboard a vehicle system having two or more propulsion-generating vehicles that are mechanically interconnected with each other in order to travel along a route together. The controller is configured to operatively connect with the propulsion-generating vehicles and a first wireless communication device. The controller is configured to direct the first wireless communication device to switch between operating in an off-board communication mode and operating in an onboard communication mode. In the off-board communication mode, the first wireless communication device is configured to receive remote data signals from a location that is disposed off-board of the vehicle system. In the onboard communication mode, the first wireless communication device is configured to communicate local data signals between the propulsion-generating vehicles of the vehicle system.

In one aspect, the remote data signals that are communicated from the location that is off-board of the vehicle system are control signals. The first wireless communication device is configured to receive the control signals and convey the control signals to the controller. The controller is configured to change one or more tractive efforts or braking efforts of the vehicle system in response to the control signals.

In one aspect, the control signals are PTC signals.

In one aspect, the local data signals that are communicated between the propulsion-generating vehicles are control signals. The first wireless communication device is configured to receive the control signals and convey the control signals to the controller. The controller is configured to coordinate one or more tractive efforts or braking efforts of the two or more propulsion-generating vehicles according to the control signals.

In one aspect, the control signals are DP signals.

In one aspect, the first wireless communication device is configured to receive both the remote data signals and the local data signals during a common time period. The controller is configured to cause the propulsion-generating vehicles to operate according to the remote data signals or the local data signals according to priorities assigned to the remote data signals and the local data signals.

In one aspect, the remote data signals are assigned with higher priorities than the local data signals.

In one aspect, the controller is configured to direct the first wireless communication device to switch from the off-board communication mode to the onboard communication mode after non-receipt of the remote data signals for at least a designated time period.

In one aspect, the controller is configured to direct the first wireless communication device to switch to the onboard communication mode to augment an available bandwidth that is used to communicate the local data signals between the propulsion-generating vehicles of the vehicle system.

In one embodiment, a communication system includes a first wireless communication device configured to be disposed onboard a vehicle system. The vehicle system has two or more propulsion-generating vehicles that are mechanically interconnected with each other in order to travel along a route together. The first wireless communication device configured to switch between operating in an off-board communication mode and operating in an onboard communication mode. When the first wireless communication device is operating in the off-board communication mode, the first wireless device is configured to receive remote data signals from a location that is disposed off-board of the vehicle system. When the first wireless communication device is operating in the onboard communication mode, the first wireless communication device is configured to communicate local data signals between the propulsion-generating vehicles of the vehicle system.

In one aspect, the first wireless communication device is configured to operatively connect to a controller disposed onboard the vehicle system. The controller is configured to direct the first wireless communication device to switch from the off-board communication mode to the onboard communication mode after non-receipt of the remote data signals for at least a designated time period.

In one aspect, the first wireless communication device is a radio device.

In one aspect, the communication system also includes a second wireless communication device configured to communicate the local data signals between the propulsion-generating vehicles of the vehicle system through an available bandwidth. The first wireless communication device is configured to switch to the onboard communication mode to augment the available bandwidth to communicate the local data signals.

In one aspect, the local data signals include operational control signals and safety control signals. The operational control signals are used to direct the one or more tractive efforts or braking efforts of the propulsion-generating vehicles. The safety control signals are used to stop movement of the propulsion-generating vehicles when one or more safety regulations are violated. The second wireless communication device is configured to communicate the operational control signals. Both the first wireless communication device and the second wireless communication device are configured to communicate the safety control signals when the first wireless communication device is in the onboard mode of operation.

In one aspect, the first wireless communication device is configured to communicate the local data signals that are larger than a threshold data packet size when the first wireless communication device is in the onboard mode of operation. Meanwhile, the second wireless communication device is configured to communicate the local data signals that are no larger than the threshold data packet size.

In one aspect, the first wireless communication device is configured to communicate the local data signals of a first type when the first wireless communication device is in the onboard mode of operation. Meanwhile, the second wireless communication device is configured to communicate the local data signals of a different, second type. The first and second types of the local data signals are used to control respective different operations of the propulsion-generating vehicles.

In one aspect, the vehicle system includes two or more vehicle consists with the propulsion-generating vehicles disposed in different ones of the vehicle consists. The first wireless communication device is configured to communicate the local data signals between the different vehicle consists.

In one aspect, the first wireless communication device is configured to transmit the local control signals at a reduced signal intensity compared to the signal intensity used to transmit remote data signals.

In one embodiment, a communication system includes a radio deployed onboard a first rail vehicle of a rail vehicle consist and operative in a first mode of operation and a second mode of operation. The radio is configured when operating in the first mode of operation to communicate at least one of voice signals or data signals between the first rail vehicle and a location off-board the rail vehicle consist using a first frequency bandwidth. The radio is configured when operating in the second mode of operating to wirelessly communicate distributed power signals from the first rail vehicle to one or more remote rail vehicles in the rail vehicle consist using a different, second frequency bandwidth, for at least one of augmenting operating of other onboard wireless devices that are configured to communicate the distributed power signals in the rail vehicle consist or for acting in place of at least one of the other onboard wireless devices.

In one aspect, the radio is configured to automatically operate in the second mode of operation when the radio is not operating in the first mode of operation to communicate the at least one of the voice signals or the data signals from between the first rail vehicle and the location off-board the rail vehicle consist.

In one embodiment, a device (e.g., a wireless communication device) includes one or more antennas configured to be disposed onboard a first vehicle of a vehicle system formed from plural vehicles that include the first vehicle, a first modem configured to be disposed onboard the first vehicle and to communicate a first wireless signal to one or more of a second vehicle of the vehicles in the vehicle system or an off-board device using the one or more antennas, and a second modem configured to be disposed onboard the first vehicle and to communicate a second wireless signal to the one or more of the second vehicle or the off-board device using the one or more antennas. The first modem is configured to communicate the first wireless signal via a first type of wireless communication link and the second modem is configured to communicate the second wireless signal via a different, second type of wireless communication link.

In one aspect, the first modem includes a wireless modem configured to communicate the first wireless signal using an IEEE 802.11 standard.

In one aspect, the second modem includes a cellular modem configured to communicate the second wireless signal as a cellular signal.

In one aspect, the first modem includes a wireless modem configured to communicate the first wireless signal using an IEEE 802.11 standard and the second modem includes a cellular modem configured to communicate the second wireless signal as a cellular signal.

In one aspect, the first modem is configured to communicate the first wireless signal and the second modem is configured to communicate the second wireless signal between the first and second vehicles of the vehicle system in order to one or more of remotely control operation of the first vehicle from the second vehicle or remotely control operation of the second vehicle from the first vehicle.

In one aspect, the device also includes transceiving control circuitry configured to control operation of the first modem and the second modem. Responsive to the first modem being unable to communicate the first wireless signal in order to one or more of remotely control the operation of the first vehicle or remotely control the operation of the second vehicle, the control circuitry is configured to switch to the second modem communicating the second wireless signal in order to one or more of remotely control the operation of the first vehicle or remotely control the operation of the second vehicle.

In one aspect, the first modem is a cellular modem and the second modem is a wireless modem configured to communicate the first wireless signal using an IEEE 802.11 standard. The control circuitry is configured to switch from communicating the first wireless signal with the cellular modem to communicating the second wireless signal with the second modem to one or more of remotely control the operation of the first vehicle or remotely control the operation of the second vehicle responsive to the vehicle system entering an area where cellular communications are unavailable.

In one aspect, the first modem is a cellular modem and the second modem is a wireless modem configured to communicate the first wireless signal using an IEEE 802.11 standard. The control circuitry is configured to switch from communicating the first wireless signal with the cellular modem to communicating the second wireless signal with the second modem to one or more of remotely control the operation of the first vehicle or remotely control the operation of the second vehicle responsive to the vehicle system entering an area where a financial cost of cellular communications exceeds a designated threshold.

In one aspect, the second modem is a wireless modem configured to communicate the first wireless signal using an IEEE 802.11 standard. The control circuitry is configured to switch from communicating the first wireless signal to communicating the second wireless signal with the second modem to one or more of remotely control the operation of the first vehicle or remotely control the operation of the second vehicle responsive to the vehicle system entering an area where a publicly available wireless network is available.

In one embodiment a system (e.g., a communication system) includes a first wireless communication device comprising one or more first antennas, a first modem, and a second modem. The first wireless communication device is configured to be disposed onboard a first vehicle of a vehicle system formed from plural vehicles that include the first vehicle. The system also includes a second wireless communication device comprising one or more second antennas, a third modem, and a fourth modem. The second wireless communication device is configured to be disposed onboard a second vehicle of the vehicle system. The first modem and the third modem are configured to communicate a first wireless signal between the first and second vehicles via a first type of wireless communication link and the second modem and the fourth modem are configured to communicate a second wireless signal between the first and second vehicles via a different, second type of wireless communication link.

In one aspect, the first modem and the third modem include wireless modems configured to communicate the first wireless signal using an IEEE 802.11 standard.

In one aspect, the second modem and the fourth modem include cellular modems configured to communicate the second wireless signal as a cellular signal.

In one aspect, the first modem and the third modem are configured to communicate the first wireless signal and the second modem and the fourth modem are configured to communicate the second wireless signal between the first and second vehicles in order to one or more of remotely control operation of the first vehicle from the second vehicle or remotely control operation of the second vehicle from the first vehicle.

In one aspect, the first wireless communication device includes first transceiving control circuitry configured to control operation of the first modem and the second modem. The second wireless communication device includes second transceiving control circuitry configured to control operation of the third modem and the fourth modem. Responsive to the first modem or third modem being unable to communicate the first wireless signal in order to one or more of remotely control the operation of the first vehicle or remotely control the operation of the second vehicle, one or more of the first transceiving control circuitry or the second transceiving control circuitry is configured to switch to the second modem and the fourth modem communicating the second wireless signal in order to one or more of remotely control the operation of the first vehicle or remotely control the operation of the second vehicle.

In one aspect, the first modem and the third modem include wireless modems configured to communicate the first wireless signal using an IEEE 802.11 standard and the second modem and the fourth modem include cellular modems configured to communicate the second wireless signal as a cellular signal.

In one aspect, the wireless modems are configured to communicate a distributed power (DP) signal as the first wireless signal and the cellular modems are configured to communicate the DP signal as the second wireless signal. The system also can include a first radio configured to be disposed onboard the first vehicle and a second radio configured to be disposed onboard the second vehicle. The first and second radios are configured to establish a radio link between the first and second vehicles in order to communicate radio signals between the first radio and the second radio. Responsive to a cellular network being unavailable for the cellular modems to communicate and a wireless network being unavailable for the wireless modems to communicate, the first radio and the second radio are configured to communicate the DP signal via the radio link.

In one aspect, one or more of the first wireless communication device or the second wireless communication device is configured to switch from communicating the first wireless signal with the cellular modems to communicating the second wireless signal with the second modem and the fourth modem to one or more of remotely control the operation of the first vehicle or remotely control the operation of the second vehicle responsive to the vehicle system entering an area where cellular communications are unavailable.

In one aspect, one or more of the first wireless communication device or the second wireless communication device is configured to switch from communicating the first wireless signal with the cellular modems to communicating the second wireless signal with the second modem and the fourth modem to one or more of remotely control the operation of the first vehicle or remotely control the operation of the second vehicle responsive to the vehicle system entering an area where a financial cost of cellular communications exceeds a designated threshold.

In one aspect, one or more of the first wireless communication device or the second wireless communication device is configured to switch from communicating the first wireless signal to communicating the second wireless signal with the second modem and the fourth modem to one or more of remotely control the operation of the first vehicle or remotely control the operation of the second vehicle responsive to the vehicle system entering an area where a publicly available wireless network is available.

In one embodiment, a system (e.g., a communication system) includes a first wireless communication device comprising one or more first antennas, a first modem, and a second modem. The first wireless communication device is configured to be disposed onboard a first vehicle of a vehicle system formed from plural vehicles that include the first vehicle. The system also includes a second wireless communication device comprising one or more second antennas, a third modem, and a fourth modem. The second wireless communication device is configured to be disposed onboard a second vehicle of the vehicle system. The first modem and the third modem are configured to communicate a first wireless signal between the first and second vehicles via a first type of wireless communication link and the second modem and the fourth modem are configured to communicate a second wireless signal between the first and second vehicles via a different, second type of wireless communication link. The first modem and the third modem include cellular modems configured to communicate the first wireless signal as a cellular signal and the second modem and the fourth modem include non-cellular modems configured to communicate the second wireless signal as a non-cellular signal.

In one aspect, one or more of the first wireless communication device or the second wireless communication device is configured to switch from communicating the first wireless signal with the cellular modems to communicating the second wireless signal with the second modem and the fourth modem to one or more of remotely control the operation of the first vehicle or remotely control the operation of the second vehicle responsive to the vehicle system entering an area where cellular communications are unavailable.

In one aspect, one or more of the first wireless communication device or the second wireless communication device is configured to switch from communicating the first wireless signal with the cellular modems to communicating the second wireless signal with the second modem and the fourth modem to one or more of remotely control the operation of the first vehicle or remotely control the operation of the second vehicle responsive to the vehicle system entering an area where a financial cost of cellular communications exceeds a designated threshold.

In one aspect, one or more of the first wireless communication device or the second wireless communication device is configured to switch from communicating the first wireless signal to communicating the second wireless signal with the second modem and the fourth modem to one or more of remotely control the operation of the first vehicle or remotely control the operation of the second vehicle responsive to the vehicle system entering an area where a publicly available wireless network is available.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A device comprising:
one or more antennas configured to be disposed onboard a first vehicle of a vehicle system formed from plural vehicles that include the first vehicle;
a first modem configured to be disposed onboard the first vehicle and to communicate a first wireless signal with one or more of a second vehicle of the vehicles in the vehicle system or with an off-board device using the one or more antennas; and
a second modem configured to be disposed onboard the first vehicle and to communicate a second wireless signal with the one or more of the second vehicle or with the off-board device using the one or more antennas, wherein the first modem is configured to communicate the first wireless signal via a first type of wireless communication link and the second modem is configured to communicate the second wireless signal via a different, second type of wireless communication link.

2. The device of claim 1, wherein the first modem includes a wireless modem configured to communicate the first wireless signal using an IEEE 802.11 standard.

3. The device of claim 1, wherein the second modem includes a cellular modem configured to communicate the second wireless signal as a cellular signal.

4. The device of claim 1, wherein the first modem includes a wireless modem configured to communicate the first wireless signal using an IEEE 802.11 standard and the second modem includes a cellular modem configured to communicate the second wireless signal as a cellular signal.

5. The device of claim 1, wherein the first modem is configured to communicate the first wireless signal and the second modem is configured to communicate the second wireless signal between the first and second vehicles of the vehicle system in order to one or more of remotely control operation of the first vehicle from the second vehicle or remotely control operation of the second vehicle from the first vehicle.

6. The device of claim 5, further comprising transceiving control circuitry configured to control operation of the first modem and the second modem, wherein, responsive to the first modem being unable to communicate the first wireless signal in order to one or more of remotely control the operation of the first vehicle or remotely control the operation of the second vehicle, the control circuitry is configured to switch to the second modem communicating the second wireless signal in order to one or more of remotely control the operation of the first vehicle or remotely control the operation of the second vehicle.

7. The device of claim 6, wherein the first modem is a cellular modem and the second modem is a wireless modem configured to communicate the first wireless signal using an IEEE 802.11 standard, and wherein the control circuitry is configured to switch from communicating the first wireless signal with the cellular modem to communicating the second wireless signal with the second modem to one or more of remotely control the operation of the first vehicle or remotely control the operation of the second vehicle responsive to the vehicle system entering an area where cellular communications are unavailable.

8. The device of claim 6, wherein the first modem is a cellular modem and the second modem is a wireless modem configured to communicate the first wireless signal using an IEEE 802.11 standard, and wherein the control circuitry is configured to switch from communicating the first wireless signal with the cellular modem to communicating the second wireless signal with the second modem to one or more of remotely control the operation of the first vehicle or remotely control the operation of the second vehicle responsive to the vehicle system entering an area where a financial cost of cellular communications exceeds a designated threshold.

9. The device of claim 6, wherein the second modem is a wireless modem configured to communicate the first wireless signal using an IEEE 802.11 standard, and wherein the control circuitry is configured to switch from communicating the first wireless signal to communicating the second wireless signal with the second modem to one or more of remotely control the operation of the first vehicle or remotely control the operation of the second vehicle responsive to the vehicle system entering an area where a publicly available wireless network is available.

10. The device of claim 1, wherein the first modem is configured to receive the first wireless signal from a source that is off-board the vehicle system for control of the vehicle system and the second modem is configured to communicate the second wireless signal from the first vehicle to one or more other vehicles in the vehicle system for remotely controlling movement of the one or more other vehicles.

11. The device of claim 10, wherein the first modem is configured to receive a positive train control signal as the first wireless signal and the second modem is configured to communicate a distributed power signal as the second wireless signal.

12. A system comprising:
a first wireless communication device comprising one or more first antennas, a first modem, and a second modem, the first wireless communication device configured to be disposed onboard a first vehicle of a vehicle system formed from plural vehicles that include the first vehicle;
a second wireless communication device comprising one or more second antennas, a third modem, and a fourth modem, the second wireless communication device configured to be disposed onboard a second vehicle of the vehicle system, wherein the first modem and the third modem are configured to communicate a first wireless signal between the first and second vehicles via a first type of wireless communication link and the second modem and the fourth modem are configured to communicate a second wireless signal between the first and second vehicles via a different, second type of wireless communication link.

13. The system of claim 12, wherein the first modem and the third modem include wireless modems configured to communicate the first wireless signal using an IEEE 802.11 standard.

14. The system of claim 12, wherein the second modem and the fourth modem include cellular modems configured to communicate the second wireless signal as a cellular signal.

15. The system of claim 12, wherein the first modem and the third modem include wireless modems configured to communicate the first wireless signal using an IEEE 802.11 standard and the second modem and the fourth modem include cellular modems configured to communicate the second wireless signal as a cellular signal.

16. The system of claim 15, wherein the wireless modems are configured to communicate a distributed power (DP) signal as the first wireless signal and the cellular modems are configured to communicate the DP signal as the second wireless signal, and further comprising a first radio configured to be disposed onboard the first vehicle and a second radio configured to be disposed onboard the second vehicle, the first and second radios configured to establish a radio link between the first and second vehicles in order to communicate radio signals between the first radio and the second radio,
wherein, responsive to a cellular network being unavailable for the cellular modems to communicate and a wireless network being unavailable for the wireless modems to communicate, the first radio and the second radio are configured to communicate the DP signal via the radio link.

17. The system of claim 15, wherein one or more of the first wireless communication device or the second wireless communication device is configured to switch from communicating the first wireless signal with the cellular modems to communicating the second wireless signal with the second modem and the fourth modem to one or more of remotely control the operation of the first vehicle or remotely control the operation of the second vehicle responsive to the vehicle system entering an area where cellular communications are unavailable.

18. The system of claim 15, wherein one or more of the first wireless communication device or the second wireless communication device is configured to switch from communicating the first wireless signal with the cellular modems to communicating the second wireless signal with the second modem and the fourth modem to one or more of remotely control the operation of the first vehicle or remotely control the operation of the second vehicle responsive to the vehicle system entering an area where a financial cost of cellular communications exceeds a designated threshold.

19. The system of claim 15, wherein one or more of the first wireless communication device or the second wireless communication device is configured to switch from communicating the first wireless signal to communicating the second wireless signal with the second modem and the fourth modem to one or more of remotely control the operation of the first vehicle or remotely control the operation of the second vehicle responsive to the vehicle system entering an area where a publicly available wireless network is available.

20. A system comprising:
a first wireless communication device comprising one or more first antennas, a first modem, and a second modem, the first wireless communication device configured to be disposed onboard a first vehicle of a vehicle system formed from plural vehicles that include the first vehicle;
a second wireless communication device comprising one or more second antennas, a third modem, and a fourth modem, the second wireless communication device configured to be disposed onboard a second vehicle of the vehicle system, wherein the first modem and the third modem are configured to communicate a first wireless signal between the first and second vehicles via a first type of wireless communication link and the second modem and the fourth modem are configured to communicate a second wireless signal between the first and second vehicles via a different, second type of wireless communication link,
wherein the first modem and the third modem include cellular modems configured to communicate the first wireless signal as a cellular signal and the second modem and the fourth modem include non-cellular modems configured to communicate the second wireless signal as a non-cellular signal.

21. The system of claim 20, wherein one or more of the first wireless communication device or the second wireless communication device is configured to switch from communicating the first wireless signal with the cellular modems to communicating the second wireless signal with the second modem and the fourth modem to one or more of remotely control the operation of the first vehicle or remotely control the operation of the second vehicle responsive to the vehicle system entering an area where cellular communications are unavailable.

22. The system of claim 20, wherein one or more of the first wireless communication device or the second wireless communication device is configured to switch from communicating the first wireless signal with the cellular modems to communicating the second wireless signal with the second modem and the fourth modem to one or more of remotely control the operation of the first vehicle or remotely control the operation of the second vehicle responsive to the vehicle system entering an area where a financial cost of cellular communications exceeds a designated threshold.

* * * * *